US008379031B2

(12) United States Patent
Matsushita

(10) Patent No.: US 8,379,031 B2

(45) Date of Patent: Feb. 19, 2013

(54) IMAGE DATA MANAGEMENT APPARATUS, IMAGE DATA MANAGEMENT METHOD, COMPUTER-READABLE STORAGE MEDIUM

(75) Inventor: Takahiro Matsushita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 689 days.

(21) Appl. No.: 11/844,525

(22) Filed: Aug. 24, 2007

(65) Prior Publication Data

US 2008/0055336 A1 Mar. 6, 2008

(30) Foreign Application Priority Data

Aug. 31, 2006 (JP) ................................. 2006-236752
Jun. 5, 2007 (JP) ................................. 2007-149645

(51) Int. Cl.

| | |
|---|---|
| ***G06F 15/00*** | (2006.01) |
| ***G06T 1/00*** | (2006.01) |
| ***G09G 5/00*** | (2006.01) |
| *H04N 5/76* | (2006.01) |
| *G06F 17/00* | (2006.01) |
| *G06F 17/20* | (2006.01) |
| *G06F 17/21* | (2006.01) |
| *G06F 17/22* | (2006.01) |
| *G06F 17/24* | (2006.01) |
| *G06F 17/25* | (2006.01) |
| *G06F 17/26* | (2006.01) |
| *G06F 17/27* | (2006.01) |
| *G06F 17/28* | (2006.01) |

(52) U.S. Cl. ..................... 345/501; 345/581; 348/231.2; 715/210

(58) Field of Classification Search ............. 348/207.11, 348/207.1, 231.2, 231.3, 231.5, 333.02, 331, 348/231.4, 231; 345/619, 501, 581; 715/210
See application file for complete search history.

(56) References Cited

U.S. PATENT DOCUMENTS 5,553,211 A * 9/1996 Uotani .......................... 345/641
6,522,354 B1 * 2/2003 Kawamura et al. ........ 348/231.2
6,557,017 B1 * 4/2003 Venable ........................ 715/210
(Continued)

FOREIGN PATENT DOCUMENTS

EP 1 089 161 4/2001
JP 2001-100887 4/2001
(Continued)

OTHER PUBLICATIONS

Dowler, Mike. "PCStats.com—Get the 'Stats and Stay Informed!" Internet Archive: Wayback Machine. Sep. 21, 2004. Web. Apr. 17, 2010. < http://web.archive.org/web/20040925065512/http://www.pcstats.com/articleview.cfm?articleID=1646>.*

(Continued)

*Primary Examiner* — Ke Xiao
*Assistant Examiner* — Robert Craddock
(74) *Attorney, Agent, or Firm* — Fitzpatrick, Cella, Harper & Scinto

(57) ABSTRACT

An image data management apparatus which changes attribute information of an image on a display device, the apparatus comprises a display control unit adapted to display, on the display device, an icon representing attribute information recorded in correspondence with an image; a changing unite adapted to change the attribute information of the image by changing the icon on the display device; and a recording unit adapted to record attribute information after change in correspondence with the image.

17 Claims, 20 Drawing Sheets

U.S. PATENT DOCUMENTS

| | | | | |
|---|---|---|---|---|
| 7,868,895 | B2 * | 1/2011 | Shintani | 345/530 |
| 2003/0038846 | A1 * | 2/2003 | Hori et al. | 345/809 |
| 2005/0223329 | A1 * | 10/2005 | Schwartz et al. | 715/711 |
| 2005/0275732 | A1 | 12/2005 | Takeuchi | 348/231.99 |

FOREIGN PATENT DOCUMENTS

| | | |
|---|---|---|
| JP | 2002-108364 | 4/2002 |
| JP | 2002-152566 | 5/2002 |
| JP | 2002-185838 | 6/2002 |
| JP | 2003-030448 | 1/2003 |
| JP | 2004-040254 | 2/2004 |
| JP | 2004-104675 | 4/2004 |
| JP | 2005-175713 | 6/2005 |
| JP | 2005-292325 | 10/2005 |
| JP | 2006-005477 | 1/2006 |

OTHER PUBLICATIONS

Dayton, Linnea, and Jack Davis. The Photoshop 5/5.5 Wow! Book. Berkeley, CA: Peachpit, 2000. Print, hereafter known as "Dayton", p. 1-117.*

* cited by examiner

IMAGE DATA MANAGEMENT APPARATUS, IMAGE DATA MANAGEMENT METHOD, COMPUTER-READABLE STORAGE MEDIUM

BACKGROUND OF THE INVENTION

1. Field of the Invention

The present invention relates to an image data management technique of editing an image and its attribute information on a display.

2. Description of the Related Art

Recently, with the widespread use of digital cameras and broadband networks, operations which users can perform related to images have diversified and now, for example, include browsing, editing, and printing of images captured by image capturing devices such as digital cameras, as well as disclosing them on networks. Along with this tendency, demands have increased for image data management apparatuses capable of easily managing large amounts of image data.

FIG. 6 shows an exemplary conventional editing window for image data. In this window, designating a folder in a tree view 601 makes it possible to display the thumbnails of files in the folder. If thumbnail images are present in image files or other files, the display displays them. If no thumbnails are present, thumbnail images are generated from original images and displayed in the form of a list in a browser window 604. Buttons 602 ("minimize", "maximize", and "close" displayed from the left) are used to control window display of a standard application preinstalled in the apparatus. If the designated folder contains a large number of image files, a scroll bar 603 is displayed on a side of the browser window 604.

According to another conventional example, some server computer discloses icon images to be arranged on a menu window of a digital camera through the Internet. The user of the digital camera acquires an arbitrary icon image by accessing the homepage disclosed by the server computer, and registers the acquired icon image in correspondence with an arbitrary item in the digital camera (see, for example, Japanese Patent Laid-Open No. 2002-185838).

Some camera displays a menu window in which captured images representing, in a user-friendly manner, the respective items for setting operations of the camera body are arranged as icons, thereby allowing even a user who is not familiar with handling of the camera to easily operate it (see, for example, Japanese Patent Laid-Open No. 2002-152566).

According to the above conventional example, the user can arbitrarily set icons displayed on the menu window of the digital camera. However, this camera is not designed to display the attribute information of each image as icons and change the attribute information of an image by operating the displayed icons.

As shown in FIGS. 7A and 7B, when the attribute information of an image is displayed using only text, it is difficult for the user to understand to which displayed item each piece of attribute information set in the digital camera corresponds. It is also difficult for the user to intuitively grasp which operation he/she should perform to change the attribute information of an image.

SUMMARY OF THE INVENTION

The present invention has been made in consideration of the above problems and implements an image data management technique which allows a user to change the attribute information of an image captured by a camera or the like by displaying the attribute information as icons and letting the user change the displayed icons.

According to the present invention, there is provided an image data management apparatus which changes attribute information of an image on a display device, the apparatus comprising: a display control unit adapted to display, on the display device, an icon representing attribute information recorded in correspondence with an image; a changing unit adapted to change the attribute information of the image by changing the icon on the display device; and a recording unit adapted to record attribute information after change in correspondence with the image.

According to the present invention, there is provided an image data management method of changing attribute information of an image on a display device, the method comprising the steps of: displaying, on the display device, an icon representing attribute information recorded in correspondence with an image; changing the attribute information of the image by changing the icon on the display device; and recording attribute information after change in correspondence with the image.

According to the present invention, there can be implemented an image data management technique which allows a user to change the attribute information of an image captured by a camera or the like by displaying the attribute information as icons and letting the user change the displayed icons.

Further features of the present invention will become apparent from the following description of exemplary embodiments with reference to the attached drawings.

DESCRIPTION OF THE EMBODIMENTS

The best mode for carrying out the present invention will be described in detail below with reference to the accompanying drawings.

Note that an embodiment to be described below is merely an example implementation of the present invention, and can be modified or changed, as needed, depending on the arrangement of an apparatus to which the present invention is applied and various conditions. The present invention is not limited to the following embodiments.

[System Arrangement]

Figure 1:
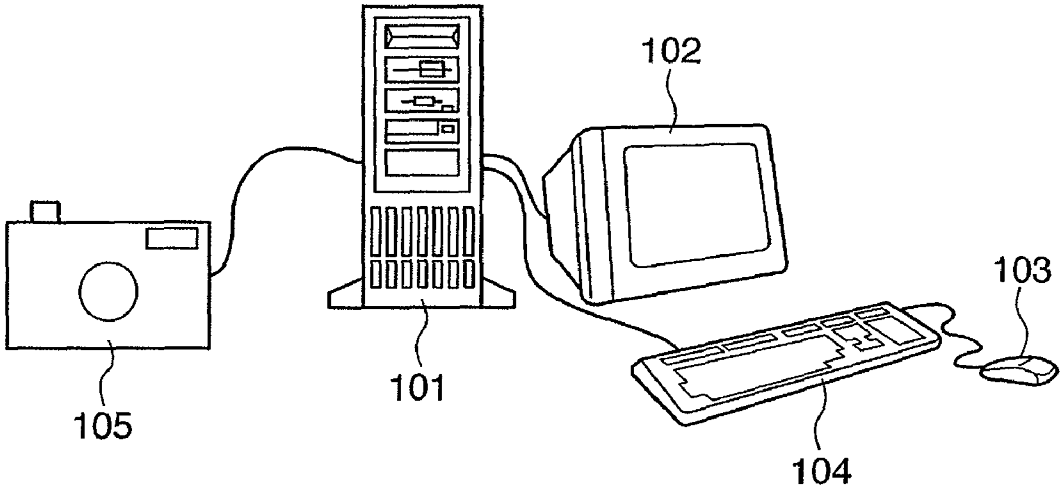
FIG. 1 is a view exemplifying the arrangement of a personal computer system which can implement an image data management apparatus according to the present invention.

FIG. 1 exemplifies the arrangement of a personal computer system as a platform which can implement an image data arrangement apparatus of the present invention.

Referring to FIG. 1, reference numeral 101 denotes a computer system (to be referred to as a PC hereinafter) body; 102, a display device which displays image data; 103, a mouse as a typical pointing device; 104, a keyboard; and 105, a digital camera (to be referred to as a camera hereinafter) as an image supply device which connects to and communicates with the PC 101 through a communication cable such as that used with USB.

Figure 2:
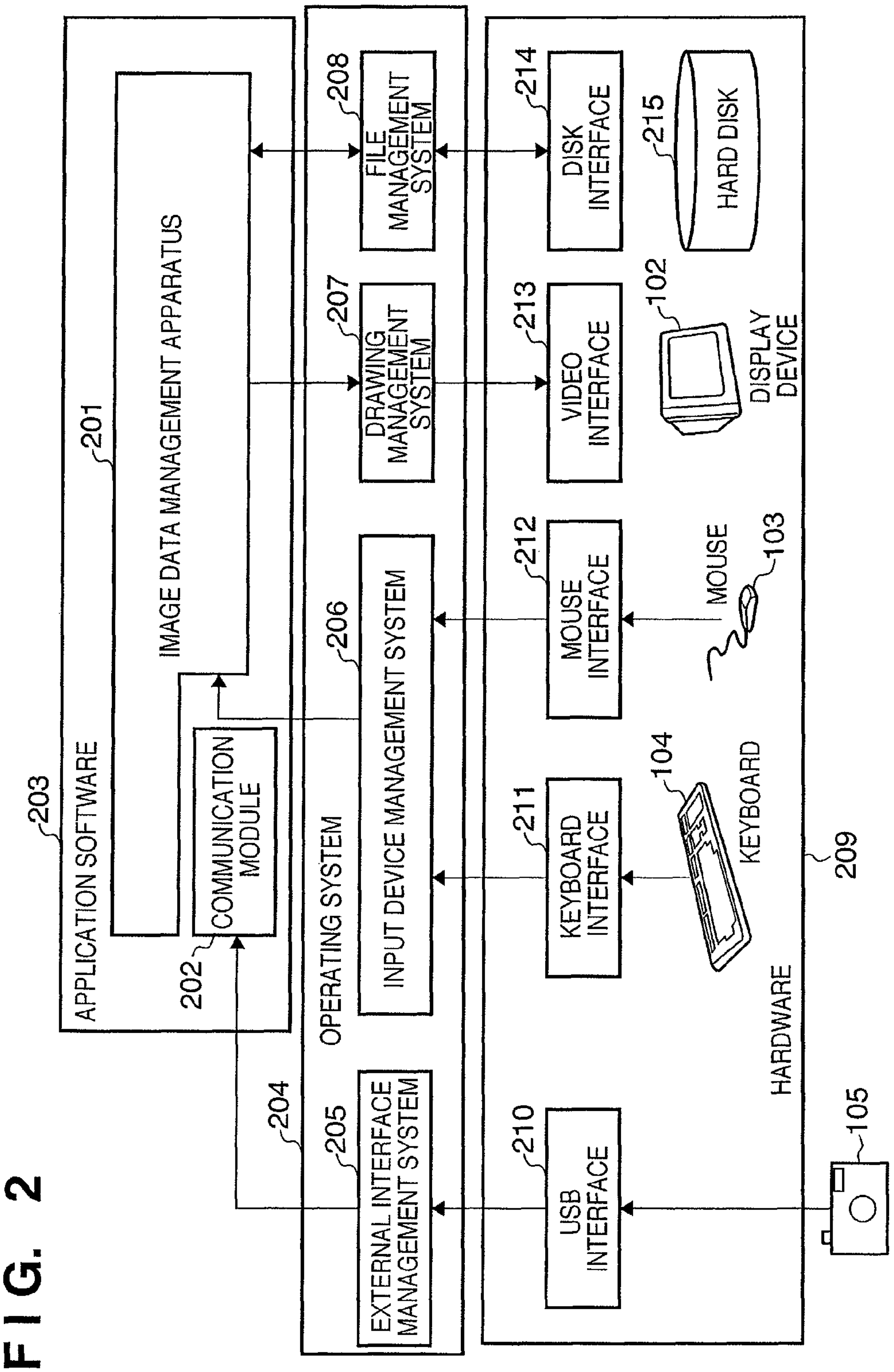
FIG. 2 is a view showing the arrangement of the image data management apparatus including software and hardware.

FIG. 2 is a view showing the arrangement of the image data management apparatus including software and hardware.

Referring to FIG. 2, reference numeral 209 denotes hardware; 204, an operating system (OS) operating on the hardware 209; and 203, application software which operates on the OS 204.

Note that of the elements constituting the hardware 209 and OS 204, elements which are naturally included as constituent elements but are not directly necessary to explain this embodiment will not be illustrated. The blocks which are not illustrated include, for example, a CPU and memory as hardware and a memory management system and the like as the OS.

Reference numeral 215 denotes a hard disk which physically stores files and data; and 208, a file management system which is part of the OS 204 and has a function of allowing application software to input and output files without being conscious of hardware.

Reference numeral 214 denotes a disk interface which allows the file management system 208 to read/write data from/in the hard disk 215; 207, a drawing management system which is part of the OS 204 and has a function of allowing application software to draw an image without being conscious of hardware; 213, a video interface which allows the drawing management system 207 to draw an image on the display device 102; and 206, an input device management system which is part of the OS 204 and has a function of allowing application software to receive an input from the user without being conscious of hardware.

Reference numeral 211 denotes a keyboard interface which allows the input device management system 206 to receive input from the keyboard 104; and 212, a mouse interface which allows the input device management system 206 to receive input from the mouse 103.

An external interface management system 205 manages the camera 105 through a USB interface 210. A communication module 202 communicates with the external interface management system 205. An image data management apparatus 201 exchanges icon data and the like with the camera 105 through the communication module 202.

[Display Processing]

Processing related to displaying the attribute information of an image by using icons according to this embodiment will be described next.

Figure 3A:
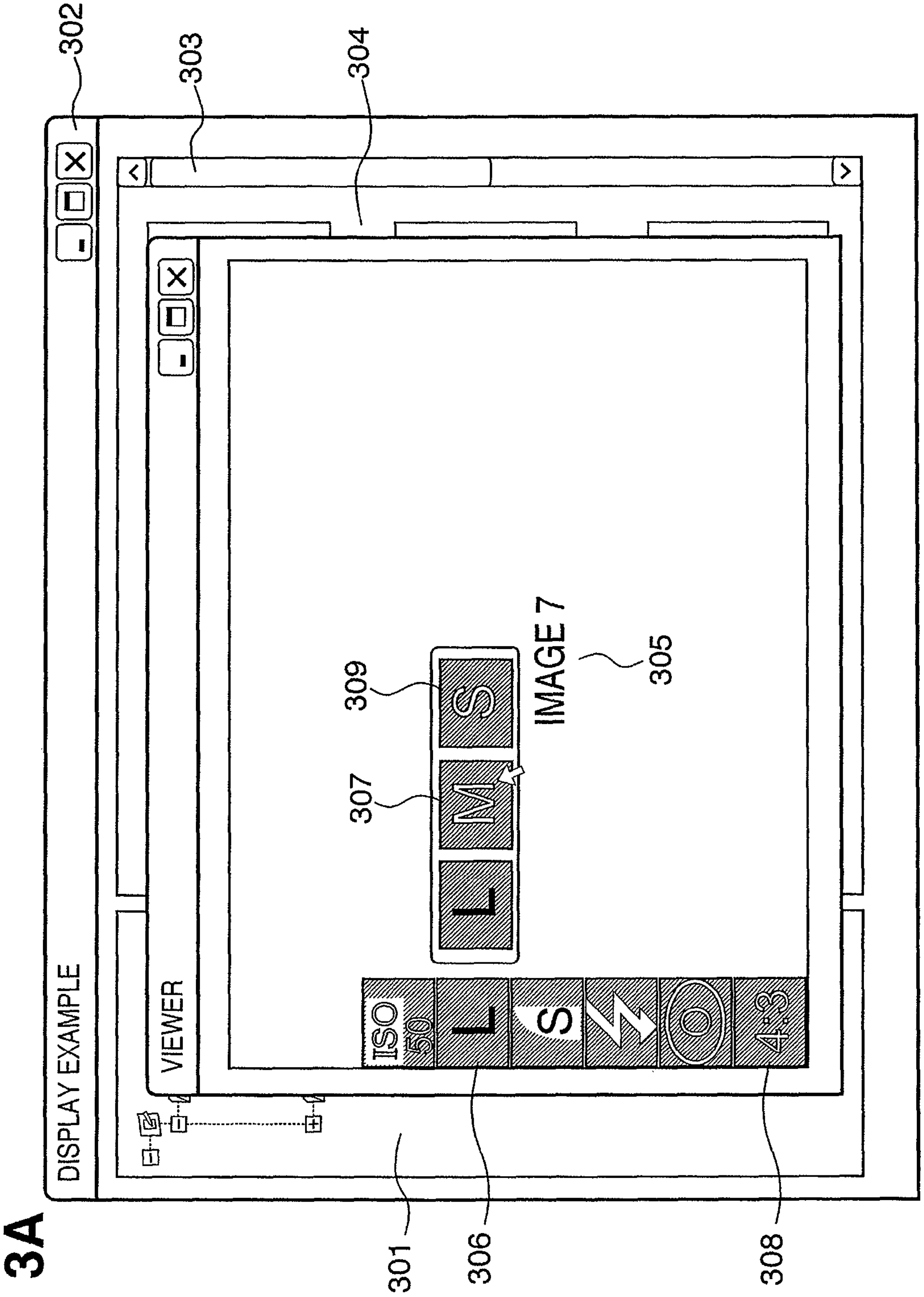
FIG. 3A is a view showing a display example in a case wherein a user changes the attribute information of an image by using icons displayed in another window by a viewer.
Figure 3B:
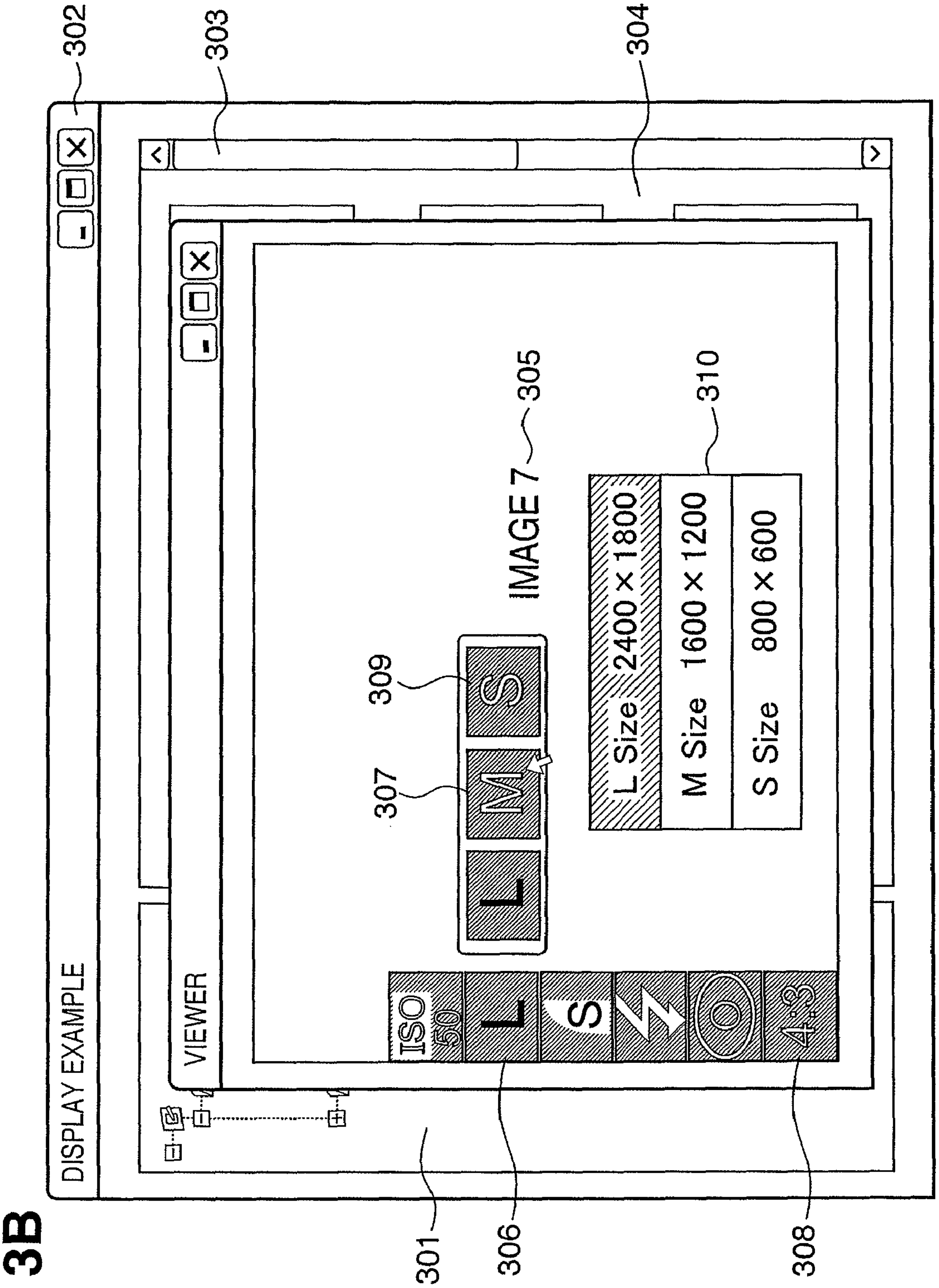
FIG. 3B is a view showing a display example in a case wherein a user changes the attribute information of an image by using icons displayed in another window by a viewer.
Figure 4A:
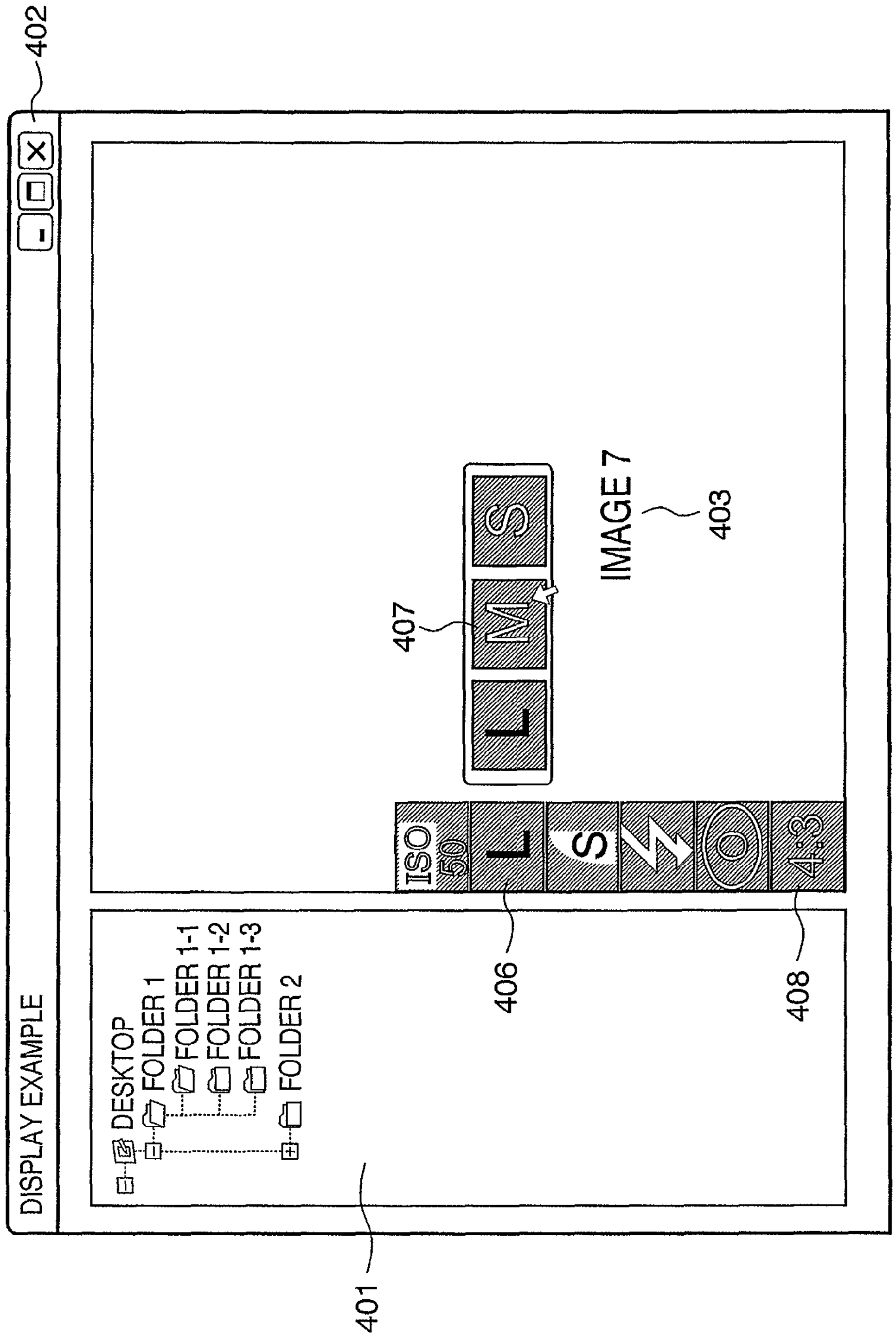
FIG. 4A is a view showing a display example in a case wherein the user changes the attribute information of an image by using icons displayed in the same window in a viewer mode.
Figure 4B:
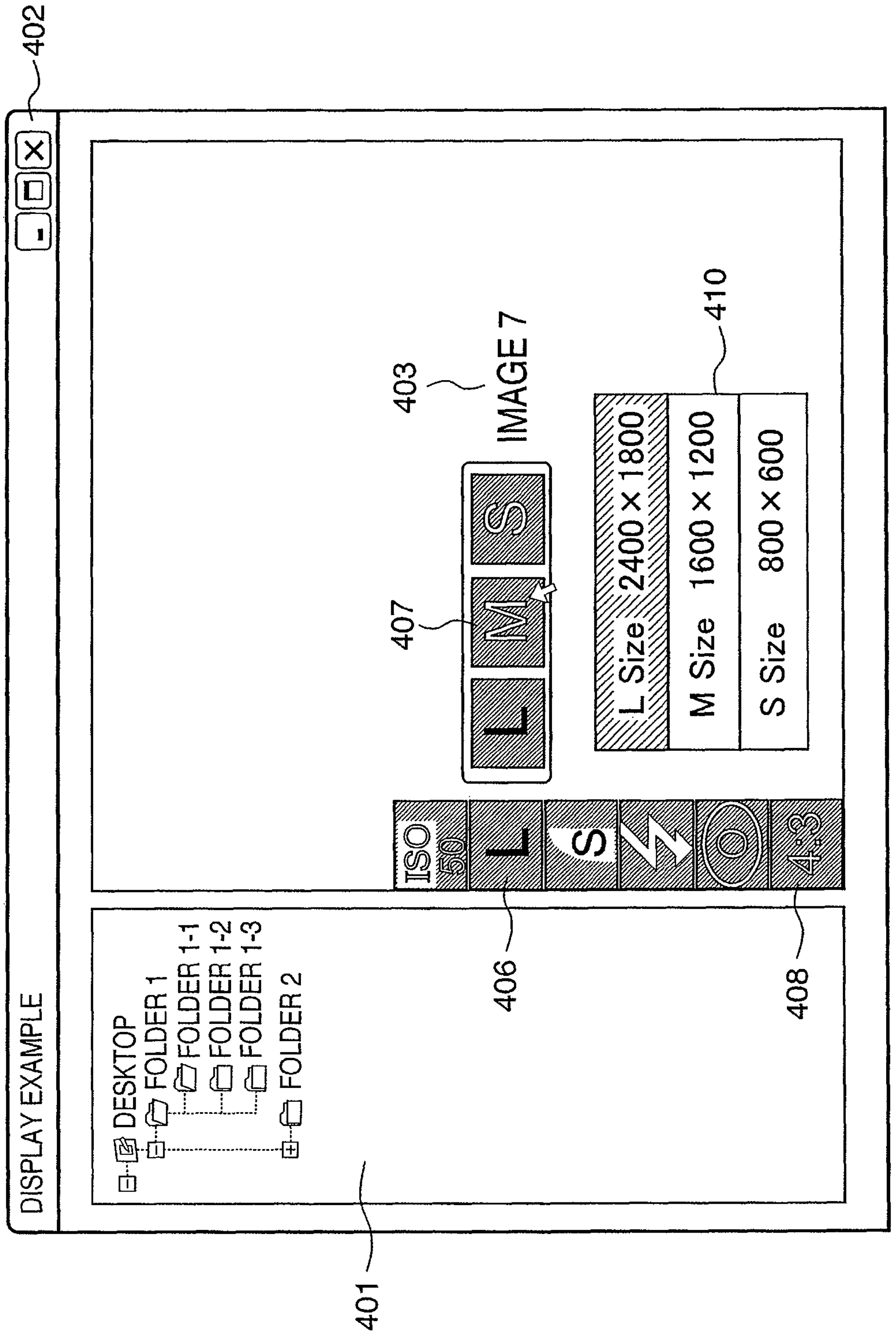
FIG. 4B is a view showing a display example in a case wherein the user changes the attribute information of an image by using icons displayed in the same window in the viewer mode.

FIGS. 3A and 3B each show a display example in a case wherein the user is to change the attribute information of an image by using icons displayed in another window by a viewer. FIGS. 4A and 4B each show a display example in a case wherein the user is to change the attribute information of an image by using icons displayed in the same window in a viewer mode.

The display example in FIG. 3A in which the effect of the present invention is largest will be described first. Obviously, the present invention also provides a sufficient merit for each of the display examples shown in FIGS. 4A and 4B.

Referring to FIG. 3A, when the user designates a folder in a tree view 301, the thumbnails of files in the folder are displayed in the form of a list in a browser window 304. Buttons 302 ("minimize", "maximize", and "close" displayed from the left) are used to control window display of an application packaged in the apparatus. If the designated folder contains a large number of image files, a scroll bar 303 is displayed on a side of the browser window 304.

Figure 7A:
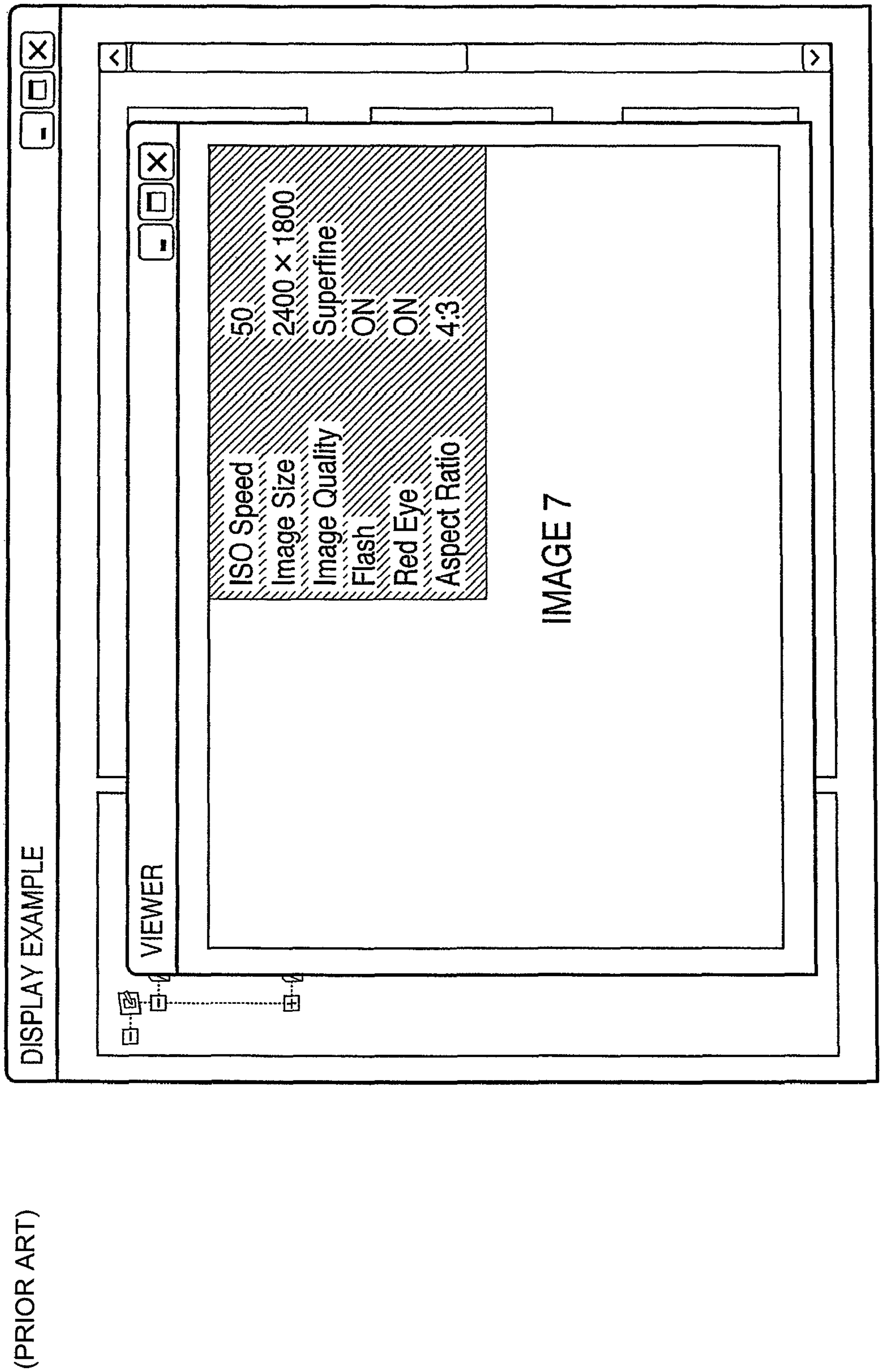
FIG. 7A (PRIOR ART)
FIG. 7A is a view showing a display example in a case wherein the attribute information of an image is displayed in another window by a viewer using only text, according to the prior art.
Figure 7B:
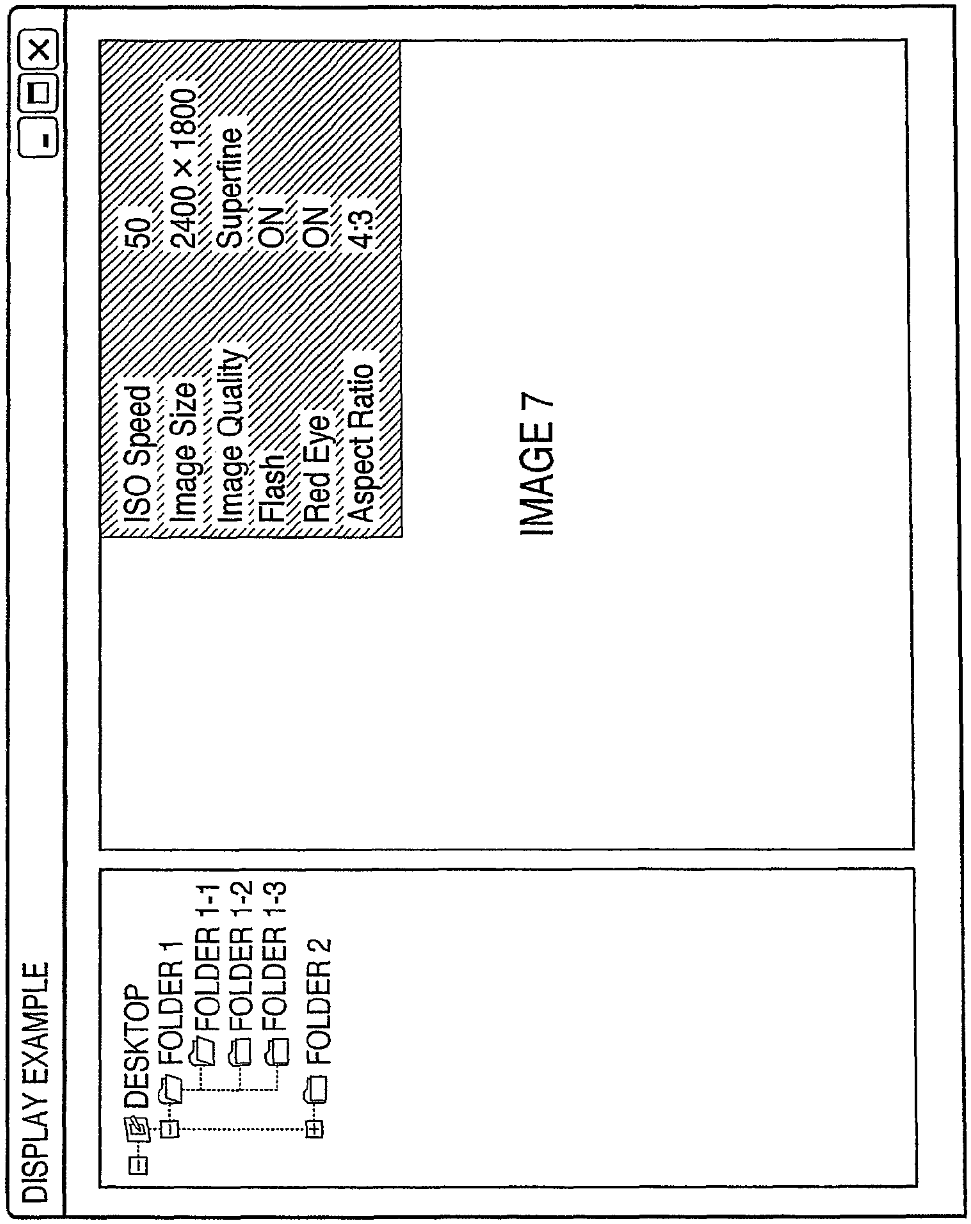
FIG. 7B (PRIOR ART)
FIG. 7B is a view showing a display example in a case wherein the attribute information of an image is displayed in the same window in a viewer mode according to the prior art.

According to the prior art, the attribute information of an image is displayed on the display using only text, a shown in FIGS. 7A and 7B. It is not easy for the user to understand to which item displayed on the display a given attribute information icon displayed on the camera corresponds. In addition, the user cannot easily and intuitively know which operation he/she needs to perform to change the attribute information of an image on the display device.

For this reason, in this embodiment, as shown in FIG. 3A, a viewer 305 displays a thumbnail, displayed in the browser window 304, in another window, and also displays the attribute information of the image using icons. For example, such icons include an icon 306 representing that the image size is L and an icon 308 representing that the aspect ratio of the image is 4:3.

Note that in this case, the icons 306 and 308 are used as icons indicating an image size and aspect ratio in a camera or the like. Displaying the attribute information of an image by using icons in this manner makes it possible to reduce the display area for the attribute information in the window as compared with display using text in the prior art. This ensures that a large area can be used for the display of an image. In addition, displaying the same icons as those used in the camera allows a user who is familiar with camera operation to intuitively recognize the attribute information of the image as compared with the case wherein the attribute information of the image is displayed with text.

A case will be described next wherein, from the attribute information of the image shown in FIG. 3A, for example, the image size is to be changed from L to M.

When the user performs a specific manipulation of the icon 306, this apparatus displays an icon 307 representing that the image size is M and an icon 309 representing that the image size is S. In this case, the specific operation indicates a mouse operation ("mouse-over, "click", or "drag"), or keyboard operation.

The following will exemplify the technique using "click". Note that the icons 307 and 309 which can change the attribute information of the image are displayed in a selectable state, and the icon 306 which cannot change the attribute information is displayed in an unselectable state. When the user clicks the icon 307, the apparatus changes the current image size; in other words, changes L size to M size. After the change, the changed icon 307 is displayed at the position of the icon 306. As described above, since the user can change the attribute information of an image by using the same icons as those used in the camera, he/she can easily edit the image on a display device, etc.

Obviously, displaying icons in the same window in the viewer mode shown in FIG. 4A can also have the same merit as that in the case shown in FIG. 3A.

Referring to FIG. 4A, when the user designates a folder in a tree view 401, the apparatus displays the thumbnails of files in the folder in the form of a list in a browser window 403. Buttons 402 ("minimize", "maximize", and "close" displayed from the left) are used to control window display of a standard application preinstalled in the apparatus.

This embodiment is not limited to the case of icons used on the camera side but also includes a case wherein prepared icons and their additional information are held in the image data management apparatus in advance, and the attribute information of an image is changed by using these pieces of information.

Referring to FIG. 3B, when the user performs "mouse-over" on the icon 307, the apparatus displays a tool chip 310 indicating detailed information concerning image sizes. Referring to FIG. 3B, the apparatus displays the respective image sizes in numerical form, and also displays items which can change the attribute information of the image in the selectable state, and items which cannot change the attribute information in the unselectable state. This allows the user to understand more detailed information concerning icons through a simple mouse operation.

When the user clicks a selectable item in the tool chip 310, the apparatus changes the image size. After the change, the apparatus displays the icon 307 at the position of the icon 306. In this manner, the user can change the attribute information of an image while understanding more detailed information concerning the icons, he/she can easily edit the image on the display device.

Obviously, displaying icons in the same window in the viewer mode shown in FIG. 4B can also have the same merit as that in the case shown in FIG. 3B.

Note that the states of the icon 306 displaying "L" in FIGS. 3A and 3B, and the icon 406 displaying "L" in FIGS. 4A and 4B are selected, since their display forms (i.e. frame border and/or color) may be changed from a normal display state.

Further, the icon displaying "L" adjacent to the icons 306 and 307 in FIGS. 3A and 3B, and the icon displaying "L" adjacent to the icons 406 and 407 in FIGS. 4A and 4B represent current attributes, since their display forms (i.e. frame border and/or color) may be changed to the other icons displaying "M" and "S".

Figure 5:
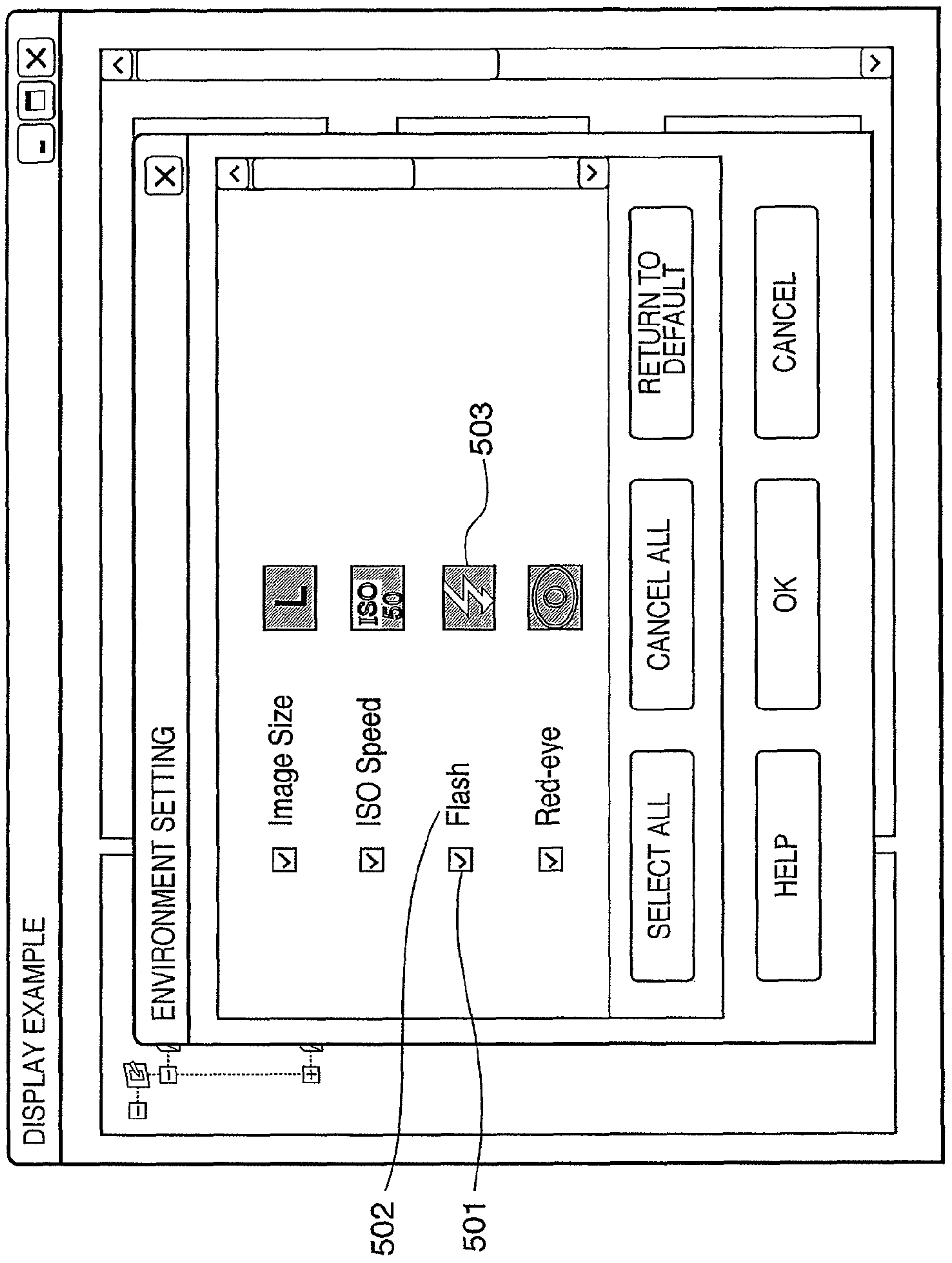
FIG. 5 is a view showing a display example of an environment setting dialog which allows selection of icons representing attribute information to be displayed in the viewer or viewer mode.
Figure 6:
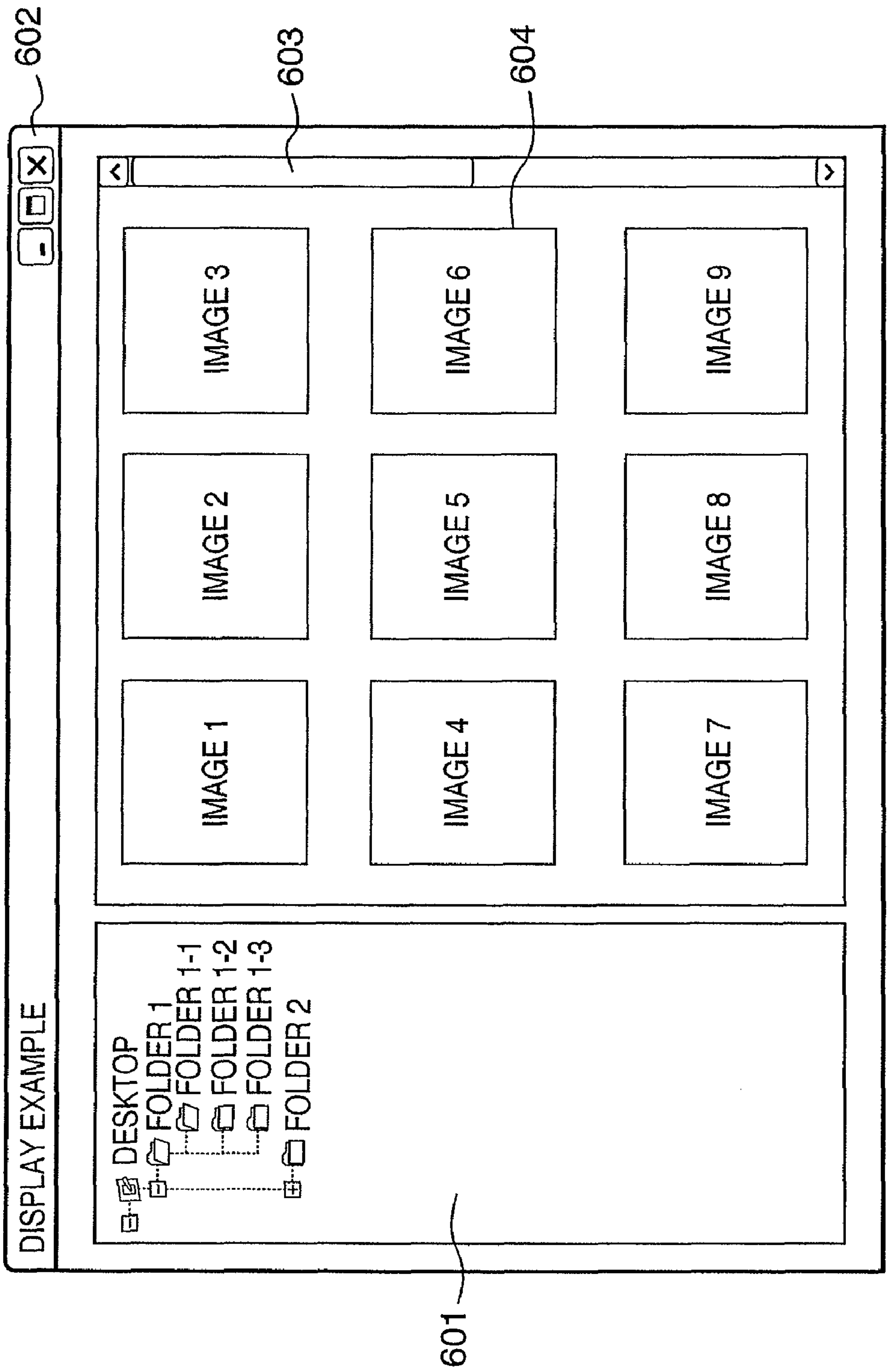
FIG. 6 is a view exemplifying a conventional editing window for image data.

FIG. 5 shows a display example of an environment setting dialog which allows the user to select an icon representing attribute information which he/she wishes to display in the viewer or viewer mode. If, for example, the user wishes to display an icon 503 representing attribute information "Flash" 502, he/she clicks in a checkbox 501.

Figure 8:
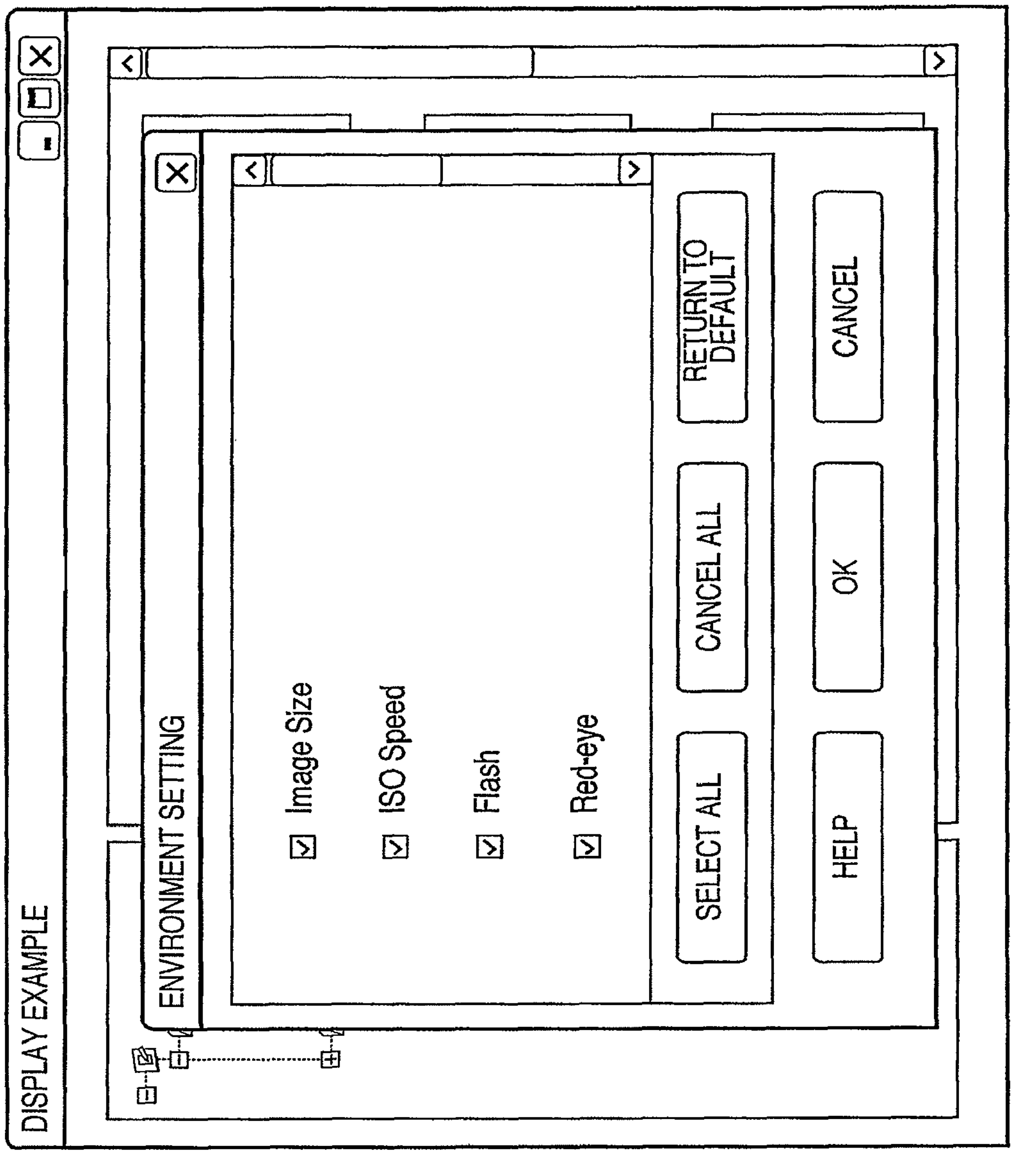
FIG. 8 (PRIOR ART)
FIG. 8 is a view showing a display example of an environment setting dialog displayed using only text, according to the prior art.

In addition, the environment setting dialog in FIG. 5 allows the user to set whether to display the tool chip representing the detailed information of the icons shown in FIGS. 3B and 4B and to set the size and position of each icon displayed in the window. Displaying icons representing attribute information in the environment setting dialog in this manner allows the user to easily and intuitively understand the UI as compared with the case wherein attribute information is displayed using only text as shown in FIG. 8.

Note that reference numerals 400*s* in FIGS. 4A and 4B replace reference numerals 300*s* denoting the same elements in FIGS. 3A and 3B.

Figure 9:
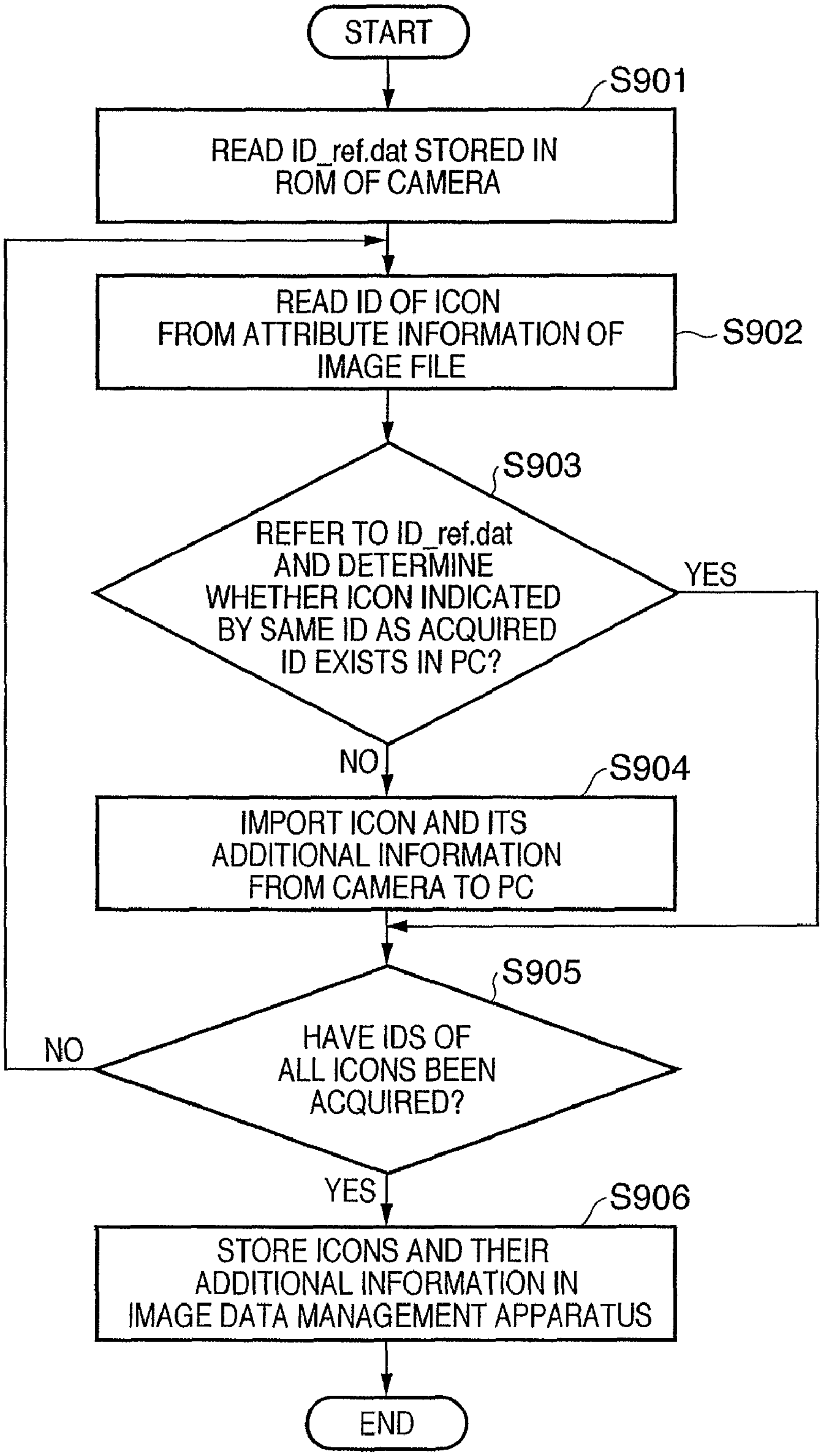
FIG. 9 is a flowchart showing the operation of importing icons and their additional information by connecting a camera to a PC.

FIG. 9 is a flowchart showing the operation of importing icons and their additional information by connecting the camera to the PC. In this case, the PC acquires the IDs of the attribute information of image files stored in the storage medium of the camera and imports icons, of the icons corresponding to the IDs, which do not exist in the PC and their additional information from the camera. It suffices to acquire the ID of attribute information from one image file. Assume that the ID of attribute information is acquired from the latest image file stored in the storage medium of the camera.

When the user connects the camera to the PC, the PC reads, in step S901, ID_ref.dat stored in the ROM of the camera.

In step S902, the PC reads the ID of the attribute information of the latest image file stored in the storage medium of the camera.

In step S903, the PC refers to ID_ref.dat stored in the ROM of the camera, and determines whether the same icon as that corresponding to the acquired ID exists in the PC. If NO in step S903, the PC newly imports the icon and its additional information from the camera.

In step S905, the PC determines whether it has acquired the IDs of icons corresponding to all the pieces of attribute information.

In step S906, the PC which is the image data management apparatus stores the acquired icons and their additional information.

Note that the latest image file stored in the storage medium of the camera is presented as an example of an image file from which attribute information is read in step S902. However, the present invention is not limited to this. It suffices to read attribute information from an arbitrary image file as long as it is stored in the camera In this embodiment, since even a single ID corresponds to a plurality of icons depending on the value of attribute information, if all the icons corresponding to a single ID are acquired in advance, pieces of attribute information with different values can be displayed in the same item. If, therefore, the PC acquires in advance icons corresponding to the IDs of all the items of the attribute information of one image file, the PC can display the attribute information of an image file with the same items as those of the attribute information of this image file as icons. A plurality of images stored in the camera are likely to be captured by the same camera, and the items of attribute information of the images are likely to be the same. Acquiring icons on the basis of the IDs of the attribute information of one image file stored in the storage medium of the camera makes it possible to efficiently acquire only some of the icons stored in the ROM of the camera which are associated with the attribute information.

In step S902, it suffices to read the attribute information of an image file that is stored in the PC which is to display the attribute information, as well as an image file stored in the camera, as an image file from which attribute information is to be read. Acquiring icons on the basis of the IDs of the attribute information of an image whose attribute information are actually displayed makes it possible to acquire a minimum number of necessary icons of the icons stored in the ROM of the camera.

Referring to FIG. 9, icons are acquired on the basis of the IDs of the attribute information of an image file stored in the storage medium of the camera. However, it suffices to compare ID_ref.dat stored in the ROM of the camera with each icon stored in the PC and import icons which are not present in the PC. In this case, it is not necessary to perform the processing in step S902.

According to the above description, the PC acquires icons from the camera at the time the user connects the camera to the PC. However, the present invention is not limited to this. For example, acquiring icons when the PC imports an image from the camera can reduce unnecessary processing as compared with the case wherein icons are acquired just as the user connects the camera to the PC. In addition, it suffices to prepare a button for acquiring icons in advance for a user interface in the PC for application software and to import icons when the user presses this button.

Figure 10:
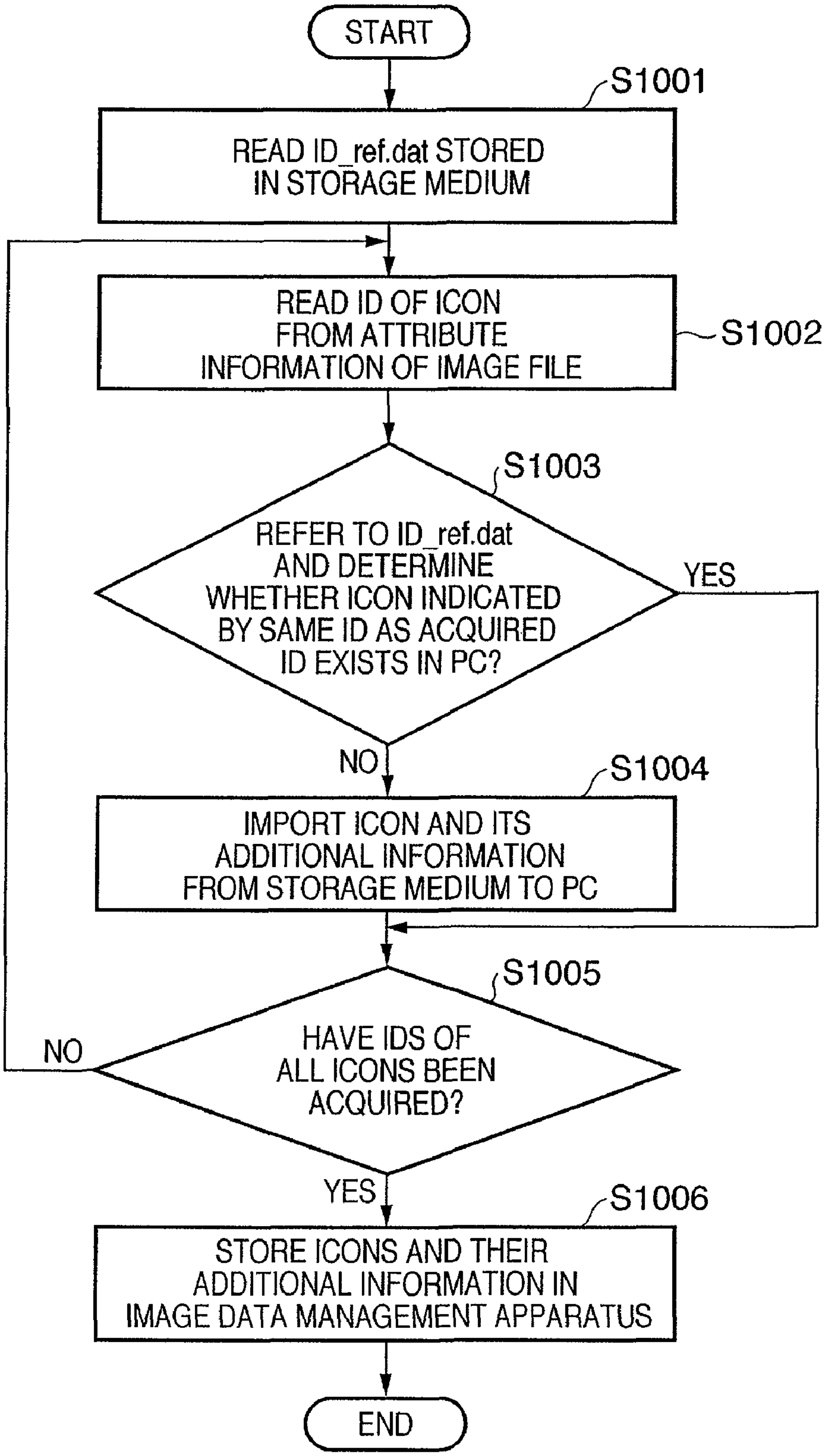
FIG. 10 is a flowchart showing the operation of importing icons and their additional information by connecting a storage medium to a PC.

FIG. 10 is a flowchart showing the operation of connecting a storage medium such as a memory card to the PC and importing icons and their additional information. The following will exemplify the processing to be performed when ID_ref.dat is stored in a storage medium such as a memory card instead of the ROM of the camera. In this case, the PC acquires the IDs of the attribute information of image files stored in the storage medium, and imports, from the storage medium, icons, of the icons corresponding to the IDs, which are not present in the PC as well as their additional information. It suffices to acquire the ID of attribute information from one image file. Assume that the ID of attribute information is acquired from the latest image file stored in the storage medium of the camera.

When the user connects a storage medium such as a memory card to the PC, the PC reads ID_ref.dat stored in the storage medium.

In step S1002, the PC acquires the ID of the attribute information of the latest image file stored in the storage medium.

In step S1003, the PC refers to ID_ref.dat stored in the storage medium, and determines whether the same icon as that corresponding to the acquired ID exists in the PC. If NO in step S1003, the PC newly imports the icon and its additional information from the storage medium in step S1004.

In step S1005, the PC determines whether it has acquired the IDs of icons corresponding to all the pieces of attribute information.

In step S1006, the PC as the image data management apparatus, stores the acquired icons and their additional information.

Note that as in the processing described with reference to FIG. 9, in the processing in FIG. 10, an image file from which attribute information is to be imported in step S1002 is not limited to the latest image file. It suffices to compare ID_ref.dat itself stored in the storage medium with each icon stored in the PC and acquire an icon which is not present in the PC. The timing of icon acquisition from a storage medium to the PC is not limited to the timing of connection.

Figure 11:
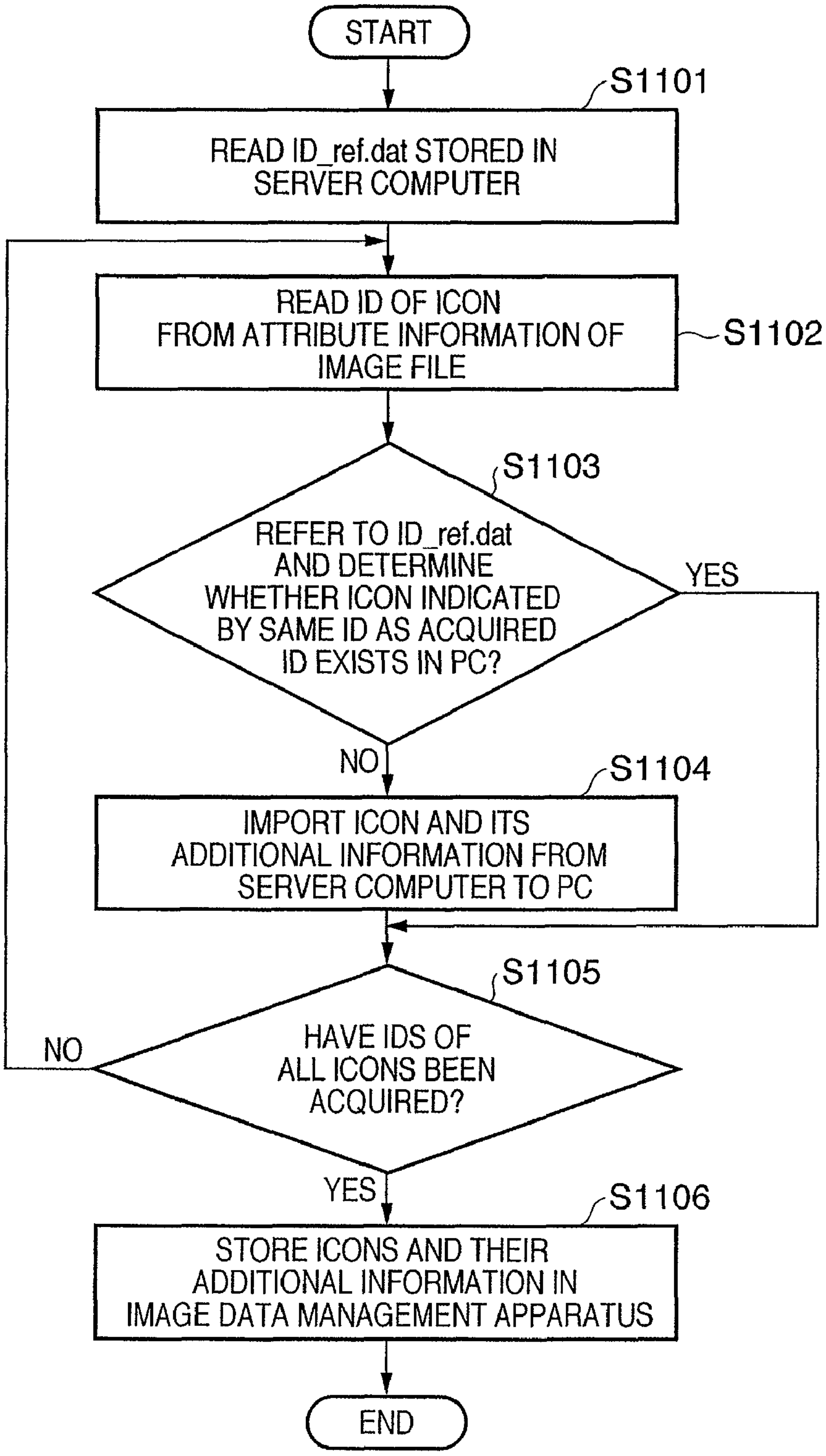
FIG. 11 is a flowchart showing the operation of importing icons and their additional information by connecting a server computer to a PC.
Figure 16:
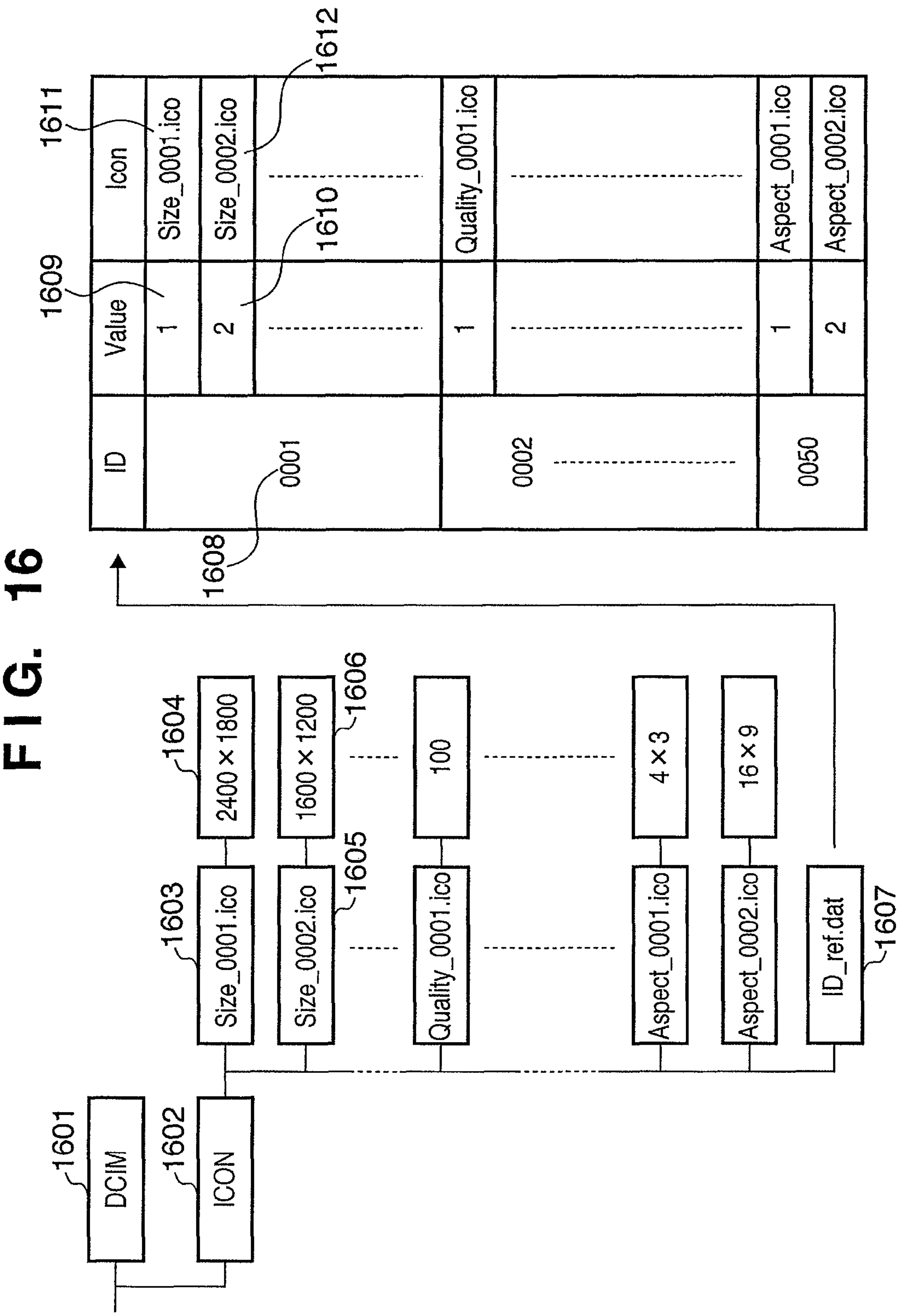
FIG. 16 is a view exemplifying a data structure for holding icons used to display and change the attribute information of an image and for holding additional information regarding the icons.

FIG. 11 is a flowchart showing the operation of connecting a server computer to the PC and importing icons and their additional information. Assume that an ICON folder 1602 having the data structure shown in FIG. 16 is held in the server computer.

When the PC connects to the server computer by activating application software in this embodiment, the PC reads ID_ref.dat stored in the sever computer in step S1101.

In step S1102, the IDs of the attribute information of an image file stored in the PC are acquired. In this case, image files from which pieces of attribute information are to be read may include, for example, all image files stored in the PC or only the latest image file of the image files stored in the PC. However, such files are not limited to these.

In step S1103, the PC refers to ID_ref.dat stored in the server computer, and determines whether the same icon as that corresponding to the acquired ID exists in the PC. If NO in step S1103, the PC newly imports the icon and its additional information from the server computer in step S1104.

In step S1105, the PC determines whether it has acquired the IDs of icons corresponding to all the pieces of attribute information.

In step S1106, the PC as the image data management apparatus stores the acquired icons and their additional information.

Note that as in the processing in FIGS. 9 and 10, it suffices to compare ID_ref.dat itself stored in the server computer with each icon stored in the PC and acquire an icon which is not present in the PC. The timing of when the PC acquires icons is not limited to this. For example, it suffices to acquire icons at the timing described with reference to FIGS. 9 and 10 or the timing when the server computer notifies the PC that ID_ref.dat has been updated.

Figure 12:
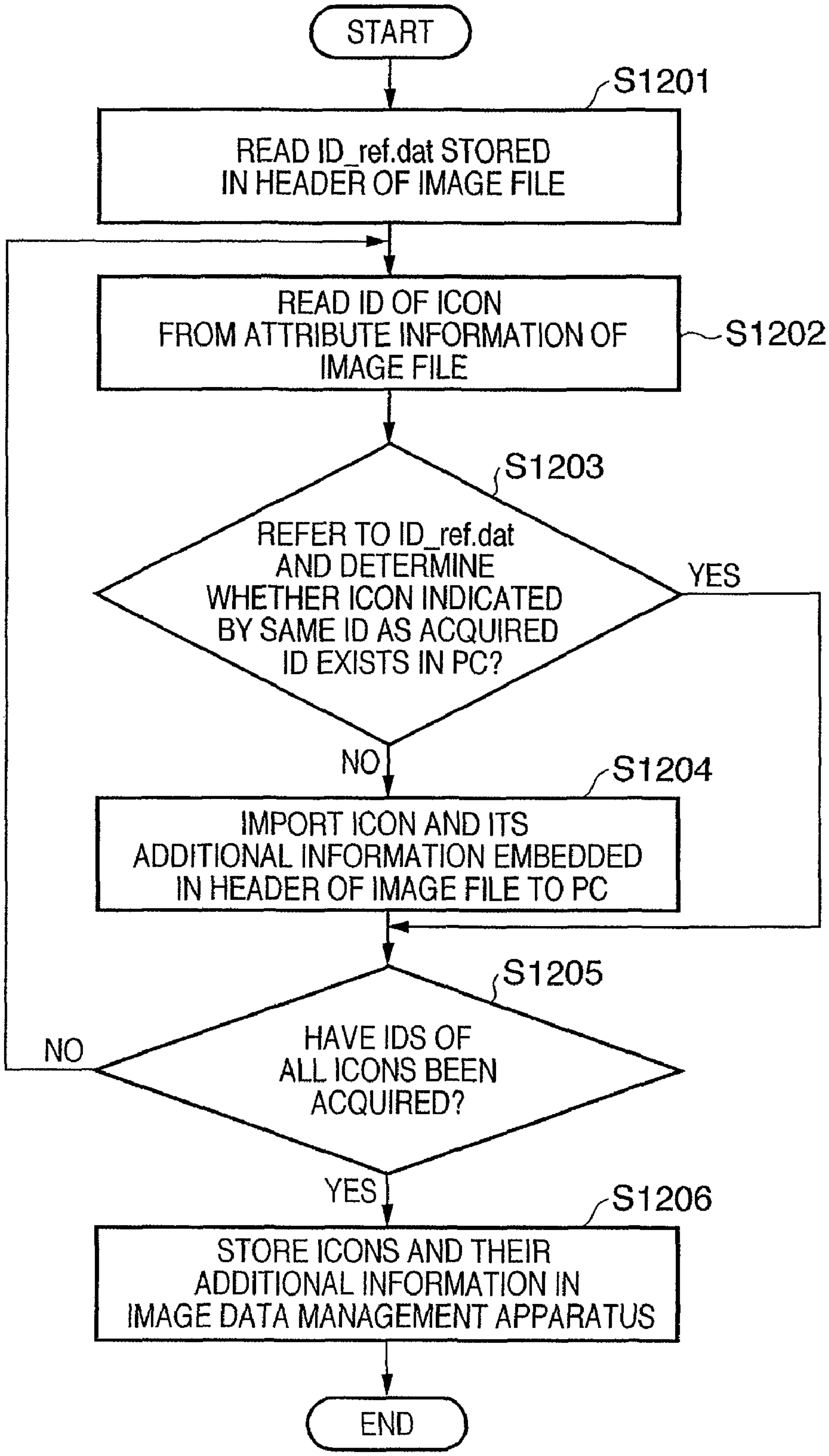
FIG. 12 is a flowchart showing the operation of importing icons and their additional information which is embedded into the header of an image file.

FIG. 12 is a flowchart showing the operation of importing icons and their additional information which are embedded in the header of an image file to be displayed on the PC. The icons and their additional information which are embedded in the header of the image file will be described in detail with reference to FIG. 17.

In step S1201, the PC reads ID_ref.dat stored in the header of an image file to be displayed.

In step S1202, the PC acquires the ID of attribute information of the image file to be displayed.

In step S1203, the PC refers to ID_ref.dat stored in the header and determines whether the same icon as that corresponding to the acquired ID exists in the PC. If NO in step S1203, the PC imports the icon and its additional information which are embedded in the header of the image file in step S1204.

In step S1205, the PC determines whether it has acquired the IDs of icons corresponding to all the pieces of attribute information.

In step S1206, the PC as the image data management apparatus stores the acquired icons and their additional information.

FIG. 16 exemplifies a data structure for holding icons used to display and change the attribute information of an image and their additional information.

Reference numeral 1601 denotes a DCIM folder storing image files.

The ICON folder 1602 stores icons for displaying the attribute information of an image file and their additional information. Assume that this ICON folder is stored in the ROM of the camera and a storage medium, and is also held on the server computer in a compressed form.

Reference numeral 1603 or 1605 denotes one icon representing an image size. An image size corresponding to the icon is written in a folder 1604 or 1606.

Reference numeral 1607 denotes a conversion table indicating the IDs of the attribute information of an image file and corresponding icons. If, for example, the ID acquired from attribute information of an image file is denoted by reference numeral 1608 and its value is denoted by reference numeral 1609 or 1610, reference numeral 1611 or 1612 denotes an icon representing the attribute information. An icon corresponding to each piece of attribute information is specified by referring to this conversion table.

Figure 17:
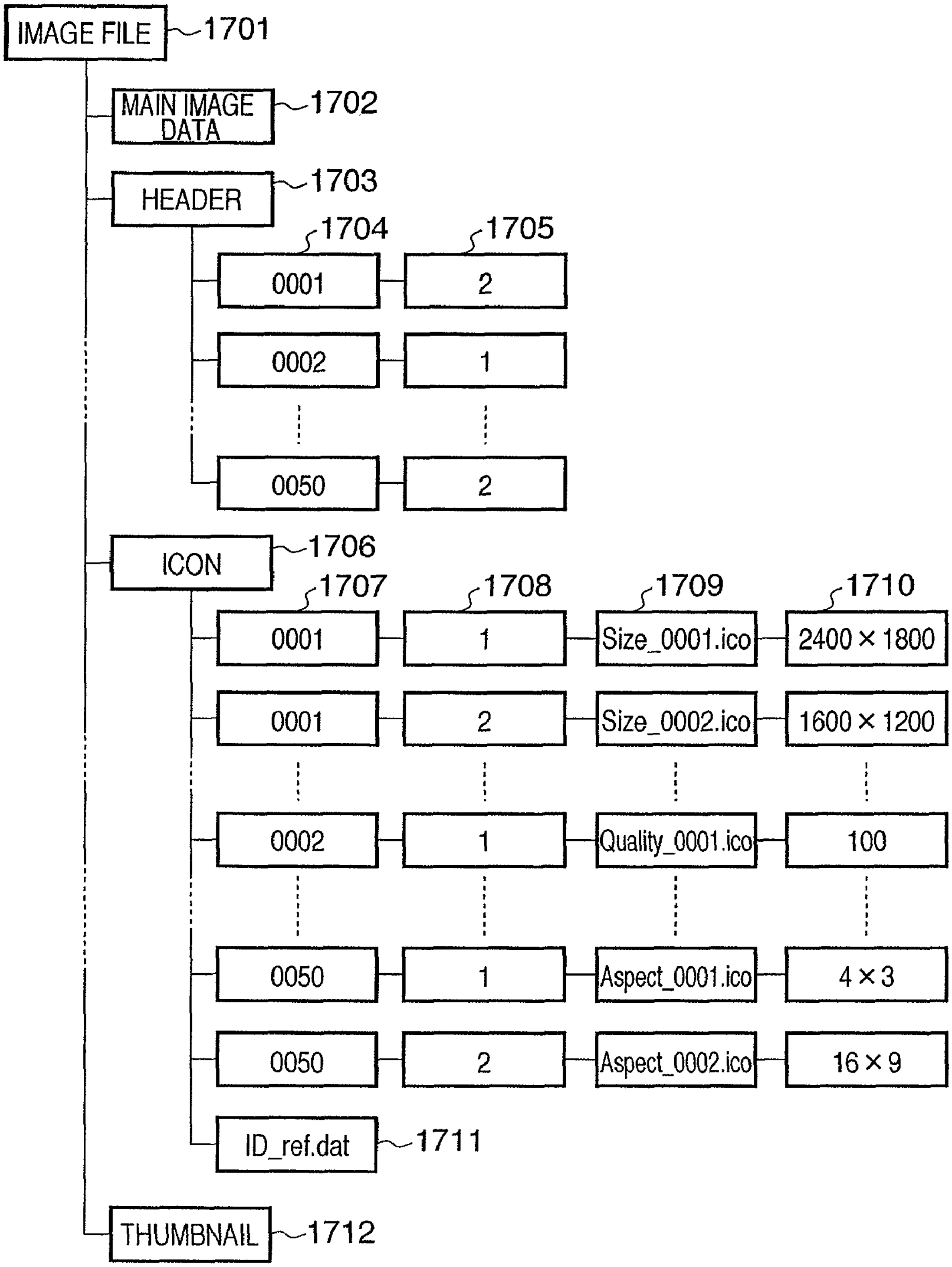
FIG. 17 is a view exemplifying a data structure in a case wherein icons and their additional information are embedded in the header of an image file.

FIG. 17 exemplifies the data structure of icons and their additional information which are added in the header of an image file.

An image file 1701 comprises main image data 1702, a header 1703, an ICON folder 1706, and a thumbnail 1712.

Reference numeral 1704 denotes the ID of attribute information; and 1705, the value of the ID.

The ICON folder 1706 stores icons for displaying and changing the attribute information of an image file and their additional information. If, for example, an ID acquired from attribute information of the image file is "0001", and its value is "1", the IDs of icons stored in the ICON folder 1706 correspond to folders 1707 and 1708. Therefore, an icon representing this attribute information is denoted by reference numeral 1709, and an image size as additional information is denoted by reference numeral 1710.

Reference numeral 1711 denotes a conversion table indicating the IDs of the attribute information of an image file and corresponding icons which are stored in the ICON folder 1706.

Figure 13:
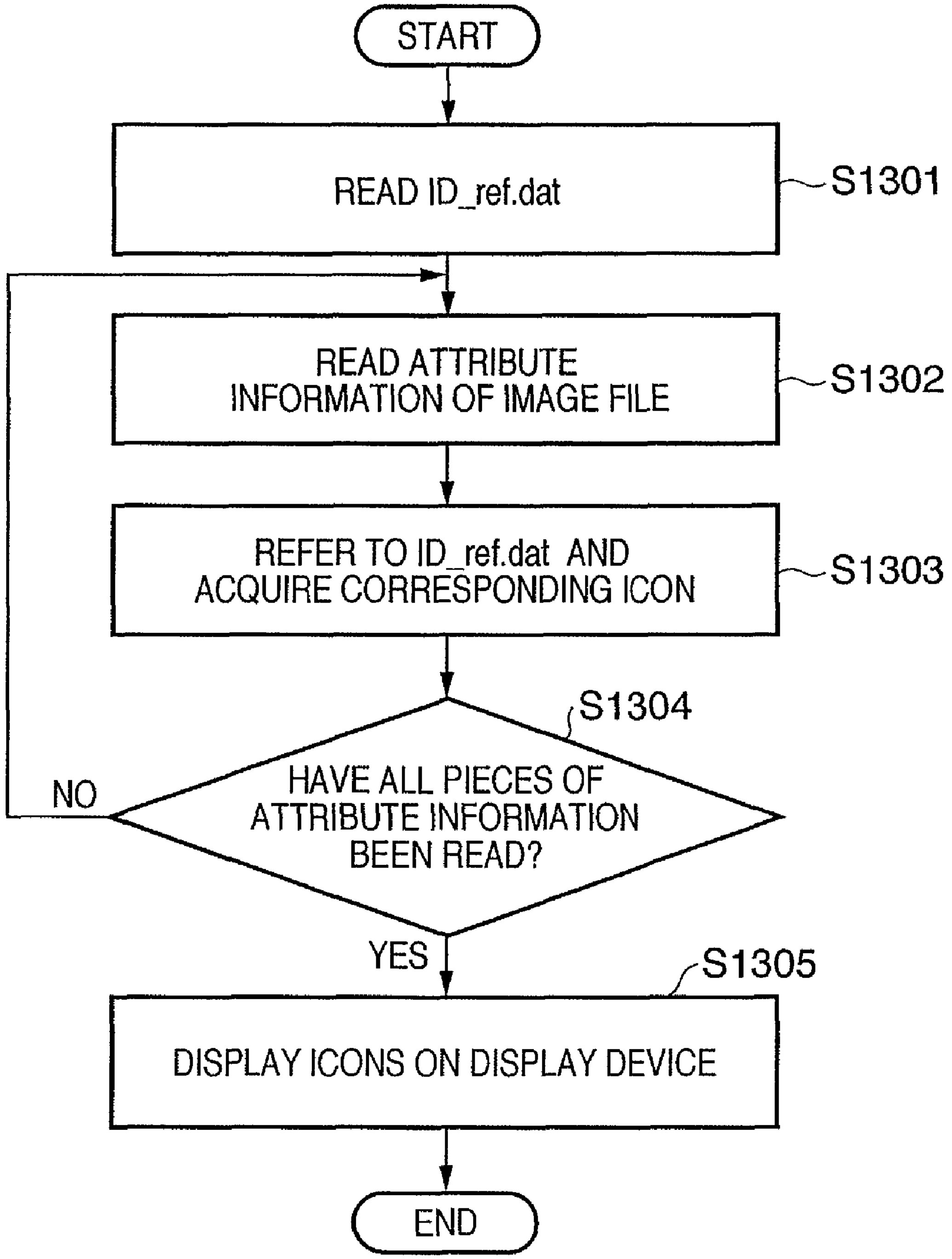
FIG. 13 is a flowchart showing the operation of displaying icons imported into a PC on a display.

FIG. 13 is a flowchart showing the operation of displaying icons imported in the PC on the display device.

In step S1301, a conversion table indicating the IDs of attribute information and icons is read from the PC.

In step S1302, the attribute information of an image file to be displayed is read.

In step S1303, an icon corresponding to the attribute information read in step S1302 is acquired by referring to the conversion table read in step S1301.

In step S1304, it is determined whether all pieces of attribute information have been read.

In step S1305, the display device displays the icons corresponding to the attribute information of the image file. In this case, if the icons of attribute information which the user wishes to have displayed in the environment setting dialog shown in FIG. 5 are set, the display device displays only the set icons.

Figure 14:
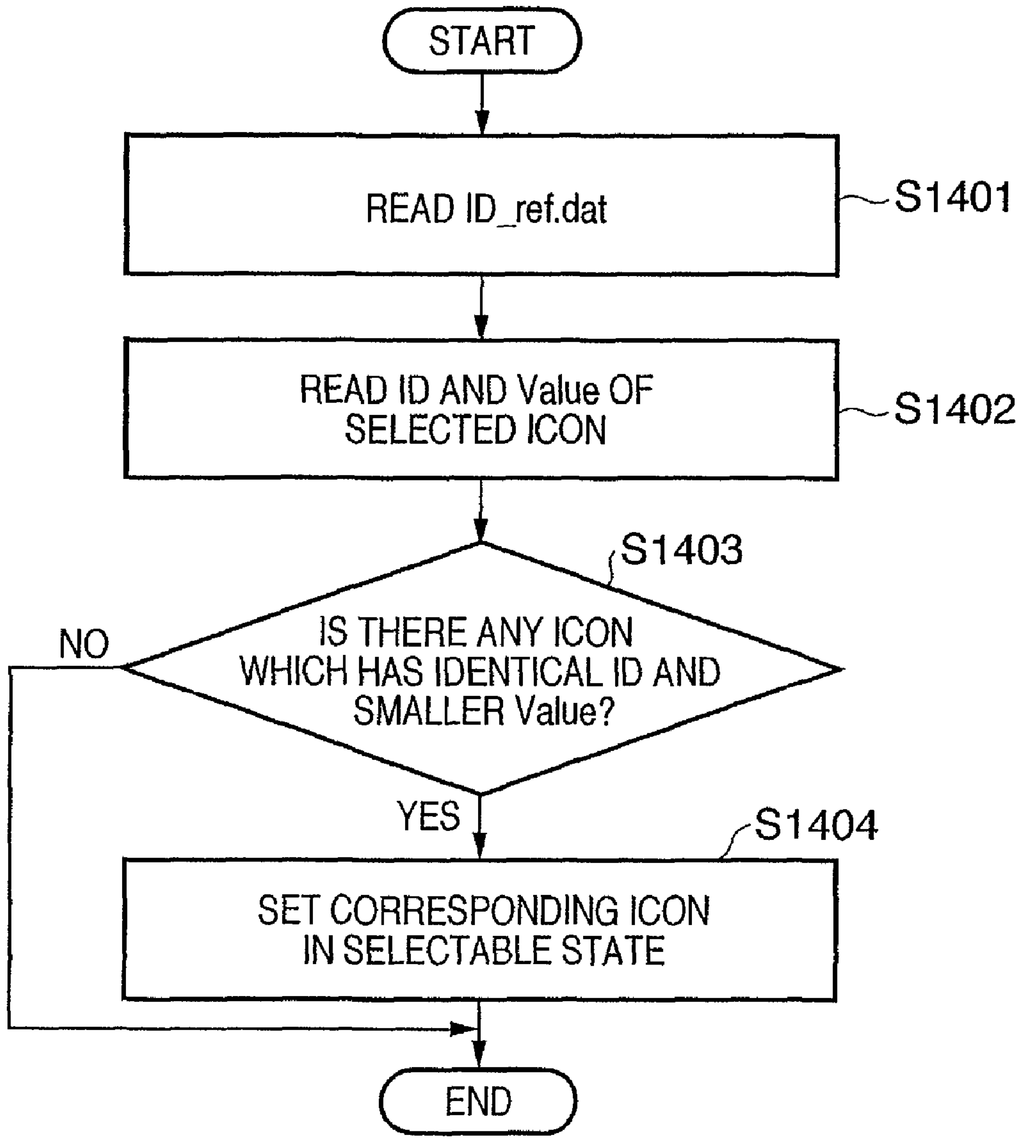
FIG. 14 is a flowchart showing the operation of determining whether a given icon is an icon which can change attribute information of an image.

FIG. 14 is a flowchart showing the operation of identifying whether a given icon is an icon which can change attribute information of an image.

In step S1401, a conversion table indicating the IDs of attribute information and icons is read from the PC.

If there is an icon, of the icons corresponding to the attribute information of the image file displayed on the display device, which is selected by specific operation, the ID and Value of the selected icon are read in step S1402.

In step S1403, it is determined whether there is an icon having an ID identical to the ID read in step S1402 and Value smaller than read Value. If YES in step S1403, the icon is displayed in the selectable state on the display device in step S1404.

Note that in this case, image sizes are exemplified, and all icons which indicate aspect ratios are always displayed in the selectable state without posing any limitations using IDs and Value. Icons which can change the attribute information of an image include, for example:

image compression ratio,
color adjustment,
image orientation,
classification information, and
moving image frame rate.

Figure 15:
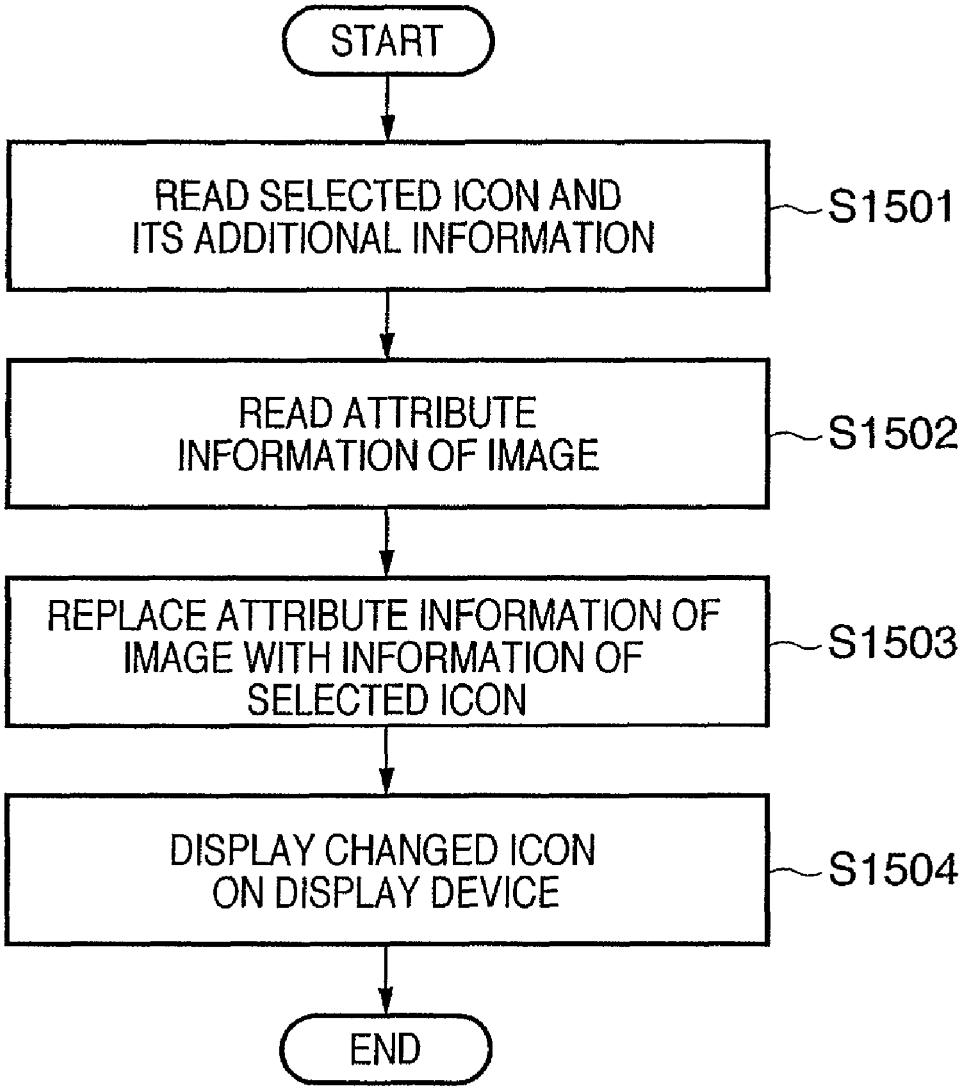
FIG. 15 is a flowchart showing the operation of changing attribute information of an image in accordance with a changed icon.

FIG. 15 is a flowchart showing the operation of changing the attribute information of an image in accordance with a changed icon.

When the user selects an icon from the icons displayed in the selectable state as a result of the processing in FIG. 14 by specific operation, this apparatus reads the icon selected in step S1501 and its additional information.

In step S1502, the apparatus reads the attribute information of the image file.

In step S1503, the apparatus rewrites the attribute information of the image file with the information represented by the selected icon, thereby editing the image.

In step S1504, the apparatus displays the changed icon on the display device.

Assume that the user can overwrite-save the image after modification or save it in a file with another name.

According to the above embodiment, when the user is to edit an image captured by a digital camera or the like in a window, the apparatus displays the attribute information of the image as icons, and the user can edit the image in accordance with attribute information after change by changing the icons. This allows the user to change the attribute information of the image by operation similar to that on the camera.

In addition, since the image data management apparatus imports icons for displaying the attribute information of a new image and their additional information from another device or an image file, the camera and the apparatus can always share the same icons regardless of the specifications of the display device and the like.

Other Embodiments

The present invention incorporates a case wherein computer programs for implementing the functions of the embodiment described above are directly or remotely supplied to a system or apparatus. In this case, the computer of the system or the like reads out and executes the computer programs.

The computer programs themselves therefore which are installed in the computer to allow the computer to implement the functions/processing of the present invention also implement the present invention.

In this case, each program may take any form, e.g., an object code, a program executed by an interpreter, and script data supplied to an OS, as long as it has the function of the program.

As a storage medium for supplying the programs, a flexible disk, hard disk, optical disk, or magnetooptical disk is available. In addition, MO, CD-ROM, CD-R, CD-RW, magnetic tape, nonvolatile memory card, ROM, DVD (DVD-ROM or DVD-R), or the like is available.

In addition, methods of supplying the programs include the following. A client computer connects to a homepage on the Internet by using a browser to download each computer program of the present invention itself from the homepage or download a compressed file containing an automatic install function into a storage medium such as a hard disk. Alternatively, the programs can be supplied by dividing the program codes constituting each program of the present invention into a plurality of files, and downloading the respective files from different homepages. That is, the present invention also incorporates a WWW server which allows a plurality of users to download program files for causing the computer to execute the functions/processing of the present invention.

In addition, the programs can be supplied by encrypting the programs of the present invention, storing the encrypted data in storage media such as CD-ROMs, distributing them to users, and allowing users who satisfy a predetermined condition to download key information for decryption from a homepage through the Internet. In this case, the present invention is implemented by executing the encrypted programs using the key information and making a computer install the programs.

The functions of the above embodiment are implemented not only when the readout programs are executed by the computer but also when the OS running on the computer performs part or all of actual processing on the basis of the instructions of the programs.

The functions of the above embodiment are also implemented when the programs read out from the storage medium are written in the memory of a function expansion board inserted into the computer or a function expansion unit connected to the computer, and the CPU of the function expansion board or function expansion unit performs part or all of actual processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-236752, filed Aug. 31, 2006, and 2007-149645, filed Jun. 5, 2007 which are hereby incorporated by reference herein in their entirety.

What is claimed is:

1. An image data management apparatus which changes attribute information of an image, the apparatus comprising:

a connection unit constructed to communicatively connect to a digital camera;

a determination unit constructed to determine whether icons which satisfy both of first and second conditions are present in the image data management apparatus so as to display attribute information of an image in the image data management apparatus by using a same icon as an icon used in the digital camera, wherein the first condition is a case where an icon which is used in a camera is stored in the digital camera, and the second condition is a case where an icon corresponds to attribute information of an image recorded in the image data management apparatus;

an acquiring unit constructed to, when the determination unit determines that icons which satisfy both of the first and second conditions are not present in the image data management apparatus, acquire the icons which satisfy both of the first and second conditions and which are determined to be not present in the image data management apparatus by the determination unit and additional information corresponding to each determined icon from the digital camera;

a reading unit constructed to read attribute information of a recorded image from a header included in an image file of the image;

a first display control unit constructed to control to simultaneously display, on a display device, the image and a plurality of icons representing the attribute information read by the reading unit, wherein the icons to be displayed include icons acquired by said acquiring unit;

a first selection reception unit constructed to receive a user operation to select a desired icon from the plurality of icons displayed by said first display control unit;

a second display control unit constructed to control to display at least one icon representing information which is a changeable candidate for attribute information which is represented by the icon selected and received by said first selection reception unit based on the additional information, when the selection is received by said first selection reception unit;

a second selection reception unit constructed to receive a user operation to select a desired icon from the icons displayed by said second display control unit;

a changing unit constructed to change attribute information which is represented by the icon selected and received by said first selection reception unit into attribute information which is represented by the icon selected and received by said second selection reception unit in the attribute information of the image; and a recording control unit constructed to control to record in the header of the image file attribute information of the image which is changed by said changing unit.

2. The apparatus according to claim 1, wherein an icon and additional information corresponding to the icon which are acquired from the digital camera are added in a header of an image file.

3. The apparatus according to claim 1, further comprising a unit constructed to determine whether attribute information which is represented by the icon selected by the first selection reception unit can be changed or not, wherein said second display control unit displays an icon representing the attribute information in a selectable state on the display device if the attribute information which is represented by the icon selected by the first selection reception unit can be changed, and displays the icon representing the attribute information in an unselectable state on the display device if the attribute information cannot be changed.

4. The apparatus according to claim 1, wherein said first display control unit displays a thumbnail of the image and an icon representing attribute information of the image in the same window on the display device.

5. The apparatus according to claim 1, wherein said first display control unit displays a thumbnail of the image and an icon representing attribute information of the image in different windows on the display device.

6. The apparatus according to claim 1, further comprising an editing unit constructed to edit the image in accordance with changing of the attribute information by said changing unit.

7. The apparatus according to claim 1, further comprising an updating unit constructed to update a display so as to display the icon selected and received by said second selection reception unit as substitute for the icon representing attribute information displayed by said first display control unit, when attribute information is changed by said changing unit.

8. The apparatus according to claim 1, wherein the attribute information of the image includes at least one of image size, image compression ratio, classification information and moving image frame rate.

9. The apparatus according to claim 1, wherein the attribute information of the image is a size of the image, and the second display control unit displays an icon representing information of the image size which is smaller than an image size recorded as part of the attribute information of the header of the current image file.

10. An image management method of controlling an image data management apparatus to change attribute information of an image, the method comprising:

a connection step of communicatively connecting to a digital camera;

a determining step of determining whether icons which satisfy both of first and second conditions are present in the image data management apparatus so as to display attribute information of an image in the image data management apparatus by using a same icon as an icon used in the digital camera, wherein the first condition is a case where an icon which is used in a camera is stored in the digital camera, and the second condition is a case where an icon corresponds to attribute information of an image recorded in the image data management apparatus;

an acquiring step of, when the determining step determines that icons which satisfy both of the first and second conditions are not present in the image data management apparatus, acquiring the icons which satisfy both of the first and second conditions and which are determined to be not present in the image data management apparatus in the determining step and additional information corresponding to each determined icon from the digital camera;

a reading step of reading attribute information of a recorded image from a header included in an image file of the image;

a first display control step of controlling to simultaneously display, on a display device, the image and a plurality of icons representing the attribute information read in the reading step, wherein the icons to be displayed include icons acquired in said acquiring step;

a first selection reception step of receiving a user operation to select a desired icon from the plurality of icons displayed by the first display control step;

a second display control step of controlling to display at least one icon representing information which is a changeable candidate for attribute information which is represented by the icon selected and received by the first selection reception step based on the additional information, when the selection is received by the first selection reception step;

a second selection reception step of receiving a user operation to select a desired icon from the icons displayed by the second display control step;

a changing step of changing attribute information which is represented by the icon selected and received by the first selection reception step into attribute information which is represented by the icon selected and received by the second selection reception step in the attribute information of the image; and a recording control step of controlling to record in the header of the image file attribute information of the image which is changed by the changing step.

11. The method according to claim 10, wherein an icon and additional information corresponding to the icon which are acquired from the digital camera are added in a header of an image file.

12. The method according to claim 10, further comprising the step of determining whether attribute information which is represented by the icon selected by the first selection reception step can be changed or not, wherein in the second display control step, an icon representing the attribute information is displayed in a selectable state on the display device if the attribute information which is represented by the icon selected by the first selection reception step can be changed, and the icon representing the attribute information is displayed in an unselectable state on the display device if the attribute information cannot be changed.

13. The method according to claim 10, wherein in the first display control step, a thumbnail of the image and an icon representing attribute information of the image are displayed in the same window on the display device.

14. The method according to claim 10, wherein in the first display control step, a thumbnail of the image and an icon representing attribute information of the image are displayed in different windows on the display device.

15. The method according to claim 10, further comprising the editing step of editing the image in accordance with changing of the attribute information in the changing step.

16. The method according to claim 10, further comprising an updating step of updating a display so as to display the icon selected and received by the second selection reception step as substitute for the icon representing attribute information displayed by the first display control step, when attribute information is changed in the changing step.

17. A non-transitory computer-readable storage medium which retrievably stores a program for causing a computer of an image data management apparatus which changes attribute information of an image to execute the method comprising:

a connection step of communicatively connecting to a digital camera;

a determining step of determining whether icons which satisfy both of first and second conditions are present in the image data management apparatus so as to display attribute information of an image in the image data management apparatus by using a same icon as an icon used in the digital camera, wherein the first condition is a case where an icon which is used in a camera is stored in the digital camera, and the second condition is a case where an icon corresponds to attribute information of an image recorded in the image data management apparatus;

an acquiring step of, when the determining step determines that icons which satisfy both of the first and second conditions are not present in the image data management apparatus, acquiring the icons which satisfy both of the first and second conditions and which are determined to be not present in the image data management apparatus in the determining step and additional information corresponding to each determined icon from the digital camera;

a reading step of reading attribute information of a recorded image from a header included in an image file of the image;

a first display control step of controlling to simultaneously display, on a display device, the image and a plurality of icons representing the attribute information read in the reading step, wherein the icons to be displayed include icons acquired in said acquiring step;

a first selection reception step of receiving a user operation to select a desired icon from the plurality of icons displayed by the first display control step;

a second display control step of controlling to display at least one icon representing information which is a changeable candidate for attribute information which is represented by the icon selected and received by the first selection reception step based on the additional information, when the selection is received by the first selection reception step;

a second selection reception step of receiving a user operation to select a desired icon from the icons displayed by the second display control step;

a changing step of changing attribute information which is represented by the icon selected and received by the first selection reception step into attribute information which is represented by the icon selected and received by the second selection reception step in the attribute information of the image; and a recording control step of controlling to record in the header of the image file attribute information of the image which is changed by the changing step.

* * * * *